United States Patent
Araki et al.

(10) Patent No.: US 11,887,758 B2
(45) Date of Patent: Jan. 30, 2024

(54) WIRE HARNESS AND INSULATED ELECTRIC WIRE THEREOF HAVING WATER-STOPPING AGENT

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Kenichiro Araki, Yokkaichi (JP); Toyoki Furukawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 261 days.

(21) Appl. No.: 17/426,581

(22) PCT Filed: Jan. 30, 2020

(86) PCT No.: PCT/JP2020/003430
§ 371 (c)(1),
(2) Date: Jul. 28, 2021

(87) PCT Pub. No.: WO2020/158862
PCT Pub. Date: Aug. 6, 2020

(65) Prior Publication Data
US 2022/0157491 A1   May 19, 2022

(30) Foreign Application Priority Data

Jan. 30, 2019  (WO) .................. PCT/JP2019/003195
Jan. 30, 2019  (WO) .................. PCT/JP2019/003196

(51) Int. Cl.
*H01B 7/285* (2006.01)
*B60R 16/02* (2006.01)
(Continued)

(52) U.S. Cl.
CPC .......... *H01B 7/285* (2013.01); *B60R 16/0207* (2013.01); *H01B 7/2825* (2013.01); *H01B 13/32* (2013.01)

(58) Field of Classification Search
None
See application file for complete search history.

(56) References Cited

U.S. PATENT DOCUMENTS 2,396,702 A * 3/1946 Johnson ................. H02G 15/14
174/23 R
3,639,567 A * 2/1972 Hervig ................. H01B 13/221
264/331.19
(Continued)

FOREIGN PATENT DOCUMENTS

CA    2202191 A1 * 10/1997
CN    87102361 A * 10/1987 ............... C09D 5/44
(Continued)

OTHER PUBLICATIONS

Efunda_reference, Silicone/polyester. https://www.efunda.com/materials/polymers/properties/polymer_datasheet.cfm?MajorID=TPE&MinorID=9 (Year: 2023).*
(Continued)

*Primary Examiner* — Timothy J. Dole
*Assistant Examiner* — Muhammed Azam
(74) *Attorney, Agent, or Firm* — Oliff PLC

(57) ABSTRACT

An insulated electric wire contains: an exposed portion insulation covering is removed; a covered portion with the insulation covering; and a water-stopping portion agent is placed over the exposed portion and an area of the covered
(Continued)

portion that is adjacent to the exposed portion. The water-stopping portion contains: a filled area between the elemental wires between a conductor in the exposed portion filled with the water-stopping agent; an exposed portion outer circumferential area in which the water-stopping agent covers the outer circumference of the conductor in the exposed portion; and a covered portion outer circumferential area in which the water-stopping agent covers an outer circumference of the insulation covering in the area of the covered portion that is adjacent to the exposed portion. The layer thickness of the water-stopping agent is larger in the exposed portion outer circumferential area than in the covered portion outer circumferential area.

8 Claims, 6 Drawing Sheets

(51) Int. Cl.
*H01B 7/282* (2006.01)
*H01B 13/32* (2006.01)

(56) References Cited

U.S. PATENT DOCUMENTS

| | | | | |
|---|---|---|---|---|
| 3,737,557 | A * | 6/1973 | Verne | H01B 9/00 174/23 R |
| 4,361,507 | A * | 11/1982 | Bourland | C08L 53/025 524/505 |
| 4,978,694 | A * | 12/1990 | Vincent | H01B 13/322 524/506 |
| 5,281,757 | A * | 1/1994 | Marin | H01B 9/022 174/106 SC |
| 5,902,849 | A * | 5/1999 | Heucher | G02B 6/4401 585/12 |
| 7,952,020 | B2 * | 5/2011 | Yamamoto | H01R 13/5208 174/23 R |
| 9,853,342 | B2 * | 12/2017 | Henry | H01P 3/16 |
| 9,949,392 | B1 * | 4/2018 | Ushiro | H01B 7/2825 |
| 2006/0063418 | A1 * | 3/2006 | Motzigkeit | H02G 15/013 439/425 |
| 2007/0007038 | A1 * | 1/2007 | Cox | H02G 15/013 174/650 |
| 2008/0283268 | A1 | 11/2008 | Iwasaki et al. | |
| 2010/0212936 | A1 * | 8/2010 | Arai | H01B 7/285 29/857 |
| 2011/0048762 | A1 * | 3/2011 | Sawamura | H01B 3/441 228/110.1 |
| 2012/0097414 | A1 * | 4/2012 | O'Sullivan | H02G 3/088 174/50 |
| 2012/0217036 | A1 | 8/2012 | Kuriyagawa | |
| 2014/0299353 | A1 * | 10/2014 | Saito | H01B 7/282 29/868 |
| 2015/0349473 | A1 * | 12/2015 | Montena | H02G 15/18 174/88 C |
| 2016/0027552 | A1 | 1/2016 | Kuriyagawa et al. | |
| 2016/0260523 | A1 * | 9/2016 | Aragiri | H01B 7/282 |
| 2017/0243673 | A1 * | 8/2017 | Nakashima | C09J 133/14 |
| 2019/0096543 | A1 * | 3/2019 | Itou | H02G 15/003 |
| 2020/0286648 | A1 * | 9/2020 | Furukawa | H01B 7/0009 |

FOREIGN PATENT DOCUMENTS

| | | | | |
|---|---|---|---|---|
| CN | 1365123 A * | 8/2002 | | H01B 13/322 |
| CN | 1465617 A * | 1/2004 | | |
| CN | 101248558 A | 8/2008 | | |
| CN | 102598161 A | 7/2012 | | |
| CN | 103119662 A * | 5/2013 | | H01B 7/282 |
| CN | 103907161 A | 7/2014 | | |
| CN | 105122382 A | 12/2015 | | |
| CN | 106847407 A * | 6/2017 | | |
| CN | 106898419 A * | 6/2017 | | G02B 6/443 |
| CN | 206370303 U * | 8/2017 | | |
| CN | 107851491 A | 3/2018 | | |
| CN | 109065232 A * | 12/2018 | | |
| CN | 109074914 A | 12/2018 | | |
| DE | 3708216 A1 * | 9/1988 | | |
| DE | 202012010582 U1 * | 2/2013 | | H02G 3/088 |
| DE | 102011083952 A1 | 4/2013 | | |
| DE | 112019006772 T5 * | 10/2021 | | B60R 16/0207 |
| EP | 0332821 A2 * | 1/1989 | | |
| EP | 0720179 A2 * | 9/1995 | | |
| FR | 2472820 A1 * | 7/1981 | | |
| FR | 2500202 A1 * | 8/1982 | | |
| JE | 2013097922 A | 5/2013 | | |
| JP | S53-014169 U | 2/1978 | | |
| JP | 62040406 A * | 2/1987 | | G02B 6/4401 |
| JP | H07105746 A * | 4/1995 | | |
| JP | H08335411 A * | 12/1996 | | |
| JP | H09102222 A * | 4/1997 | | |
| JP | H09204822 A * | 8/1997 | | |
| JP | H09205714 A * | 8/1997 | | |
| JP | H1051935 A * | 2/1998 | | |
| JP | H10204227 A * | 8/1998 | | |
| JP | H11224541 A * | 8/1998 | | |
| JP | 2000-011771 A | 1/2000 | | |
| JP | 2000011771 A * | 1/2000 | | |
| JP | 2000-082834 A | 3/2000 | | |
| JP | 2003051217 A * | 2/2003 | | |
| JP | 2004221047 A * | 8/2004 | | H01B 7/285 |
| JP | 2004355897 A * | 12/2004 | | |
| JP | 2005-019392 A | 1/2005 | | |
| JP | 2005-032621 A | 2/2005 | | |
| JP | 2005048080 A * | 2/2005 | | |
| JP | 2006032127 A * | 2/2006 | | |
| JP | 2006074068 A * | 3/2006 | | |
| JP | 2007-134137 A | 5/2007 | | |
| JP | 2007-141569 A | 6/2007 | | |
| JP | 2007-226999 A | 9/2007 | | |
| JP | 2007-287647 A | 11/2007 | | |
| JP | 2007-317480 A | 12/2007 | | |
| JP | 2008-117616 A | 5/2008 | | |
| JP | 2008123712 A * | 5/2008 | | |
| JP | 2008226487 A * | 9/2008 | | |
| JP | 2009-135073 A | 6/2009 | | |
| JP | 2009231099 A * | 10/2009 | | |
| JP | 2010-113953 A | 5/2010 | | |
| JP | 2010114027 A * | 5/2010 | | |
| JP | 2010136485 A * | 6/2010 | | |
| JP | 2010154733 A * | 7/2010 | | C08F 283/008 |
| JP | 2010231978 A * | 10/2010 | | |
| JP | 2011-096567 A | 5/2011 | | |
| JP | 2012-248527 A | 12/2012 | | |
| JP | 5475158 B1 * | 4/2014 | | |
| JP | 2014100010 A * | 5/2014 | | |
| JP | 2014-107976 A | 6/2014 | | |
| JP | 2014107976 A * | 6/2014 | | |
| JP | 2014-519137 A | 8/2014 | | |
| JP | 2016-119168 A | 6/2016 | | |
| JP | 2016-225112 A | 12/2016 | | |
| WO | WO-9207366 A1 * | 4/1992 | | H01B 7/0208 |
| WO | WO-03085793 A1 * | 10/2003 | | H01R 13/5216 |
| WO | 2007/013589 A1 | 2/2007 | | |
| WO | WO-2007013589 A1 * | 2/2007 | | H01B 7/285 |
| WO | WO-2007052693 A1 * | 5/2007 | | H01B 7/285 |
| WO | WO-2007088798 A1 * | 8/2007 | | H01B 3/28 |
| WO | WO-2008040626 A1 * | 4/2008 | | B60R 16/0207 |
| WO | 2009/060639 A1 | 5/2009 | | |
| WO | WO-2009136460 A1 * | 11/2009 | | B60R 16/0207 |
| WO | WO-2009139220 A1 * | 11/2009 | | H01B 7/285 |
| WO | WO-2012042979 A1 * | 4/2012 | | H01B 7/2825 |
| WO | WO-2014125666 A1 * | 8/2014 | | B60R 16/0215 |
| WO | 2014/135615 A1 | 9/2014 | | |
| WO | WO-2014168200 A1 * | 10/2014 | | H01B 13/0013 |
| WO | WO-2019021850 A1 * | 1/2019 | | H01B 7/02 |
| WO | 2019/177016 A1 | 9/2019 | | |
| WO | WO-2019188062 A1 * | 10/2019 | | C08F 2/14 |
| WO | WO-2020157867 A1 * | 8/2020 | | H01B 7/285 |
| WO | WO-2020157868 A1 * | 8/2020 | | B60R 16/0207 |

(56) References Cited

FOREIGN PATENT DOCUMENTS

| WO | WO-2020158445 A1 * | 8/2020 | ............ H01B 7/0045 |
| WO | WO-2020158862 A1 * | 8/2020 | ......... B60R 16/0207 |

OTHER PUBLICATIONS

Jul. 20, 2022 Office Action issued in Chinese Patent Application No. 201980089342.6.
Mar. 31, 2020 Search Report issued in International Patent Application No. PCT/JP2020/003430.
Mar. 28, 2023 Office Action issued in Chinese Patent Application No. 201980089342.6.
Apr. 4, 2023 Office Action issued in Japanese Patent Application No. 2019-219009.
Jun. 2, 2022 Office Action issued in Chinese Patent Application No. 202080011663.7.
Sep. 20, 2022 Office Action issued in Japanese Patent Application No. 2020-569238.
Aug. 10, 2022 Office Action issued in Chinese Patent Application No. 202080011525.9.
Sep. 20, 2022 Office Action issued in Japanese Patent Application No. 2020-569239.
Apr. 27, 2023 Office Action issued in U.S. Appl. No. 17/426,530.
Mar. 10, 2022 Office Action issued in Indian Patent Application No. 202117036240.
Mar. 10, 2022 Office Action issued in Indian Patent Application No. 202117036742.
Mar. 17, 2022 Office Action issued in Indian Patent Application No. 202117036460.
Feb. 24, 2022 Office Action issued in Indian Patent Application No. 202117036512.
Feb. 26, 2019 Search Report issued in International Patent Application No. PCT/JP2019/003195.
Feb. 25, 2020 International Search Report issued in International Patent Application No. PCT/JP2020/001453.
Apr. 23, 2019 International Search Report issued in International Patent Application No. PCT/JP2019/003196.
U.S. Appl. No. 17/427,375, filed Jul. 30, 2021 in the name of Araki et al.
U.S. Appl. No. 17/426,577, filed Jul. 28, 2021 in the name of Araki et al.
U.S. Appl. No. 17/426,530, filed Jul. 28, 2021 in the name of Araki et al.
Jun. 22, 2023 Office Action issued in U.S. Appl. No. 17/427,375.
Jun. 16, 2023 Office Action issued in U.S. Appl. No. 17/426,577.

* cited by examiner

[6A]

[6B]

[6C]

WIRE HARNESS AND INSULATED ELECTRIC WIRE THEREOF HAVING WATER-STOPPING AGENT

TECHNICAL FIELD

The present disclosure relates to an insulated electric wire and a wire harness.

BACKGROUND ART

In some cases, water-stopping treatment is applied to a portion of an insulated electric wire in the longitudinal axis direction of the wire. For example, Patent Document 1 discloses an electric wire with a water-stopping portion that includes a twisted conductor and an insulation covering, in which the twisted conductor is continuous in the length direction while the insulation covering is cut by an appropriate length and is discontinuous in the length direction. In a portion in which the insulation covering is cut and the twisted conductor is exposed, the water-stopping portion is formed in which gaps between elemental wires of the twisted conductor and gaps between the outer circumferential surface of the twisted conductor and cut surfaces of the insulation covering are filled with a water-stopping resin, and the water-stopping resin is adhesively attached to the cut surfaces of the insulation covering.

CITATION LIST

Patent Document
Patent Document 1: JP 2000-11771 A

SUMMARY OF INVENTION

Technical Problem

In the configuration disclosed in Patent Document 1, when the water-stopping portion is formed, the water-stopping resin is adhesively attached to the cut surfaces of the insulation covering located on both sides of the portion in which the twisted conductor is exposed, and the water-stopping portion is formed only in the portion in which the twisted conductor is exposed. In this case, the mechanical strength of the water-stopping portion is low, and if a mechanical load such as bending of an electric wire is applied to the water-stopping portion or the vicinity thereof, there may be cases where a sufficient water-stopping performance cannot be maintained. For example, when the electric wire is bent, the water-stopping resin may be damaged, e.g., the water-stopping resin may crack or bend at a contact interface with the insulation covering, and the water-stopping performance may be impaired.

Thus, an object of the present invention is to provide an insulated electric wire that includes a water-stopping portion whose water-stopping performance is unlikely to be impaired by a mechanical load, and a wire harness that includes such an insulated electric wire.

Solution to Problem

An insulated electric wire according to the present disclosure contains: a conductor in which a plurality of elemental wires made of a metal material are twisted together; and an insulation covering that covers an outer circumference of the conductor, wherein the insulated electric wire contains: an exposed portion in which the insulation covering is removed from the outer circumference of the conductor; a covered portion in which the insulation covering covers the outer circumference of the conductor, the exposed portion and the covered portion being provided adjacent to each other in a longitudinal axis direction of the insulated electric wire; and a water-stopping portion in which a water-stopping agent is placed over the exposed portion and an area of the covered portion that is adjacent to the exposed portion, and the water-stopping portion contains: a filled area between the elemental wires in which gaps between the elemental wires in the exposed portion are filled with the water-stopping agent; an exposed portion outer circumferential area in which the water-stopping agent covers the outer circumference of the conductor in the exposed portion; and a covered portion outer circumferential area in which the water-stopping agent covers an outer circumference of the insulation covering in the area of the covered portion that is adjacent to the exposed portion, the filled area between the elemental wires, the exposed portion outer circumferential area, and the covered portion outer circumferential area being continuous with each other, and a layer thickness of the water-stopping agent being larger in the exposed portion outer circumferential area than in the covered portion outer circumferential area.

A wire harness according to the present disclosure includes the above-described insulated electric wire.

Advantageous Effects of Invention

The insulated electric wire and the wire harness according to the present disclosure respectively relate to an insulated electric wire that contains a water-stopping portion whose water-stopping performance is unlikely to be impaired by a mechanical load, and a wire harness that contains such an insulated electric wire.

BRIEF DESCRIPTION OF DRAWINGS

FIG. 6A illustrates the wire before a water-stopping portion is formed, FIG. 6B illustrates a partial exposure step, and FIG. 6C illustrates a tightening step.

FIG. 7A illustrates a loosening step, FIG. 7B illustrates a filling step, and FIG. 7C illustrates a retightening step.

FIG. 8A illustrates a covering movement step, and FIG. 8B illustrates a curing step.

DESCRIPTION OF EMBODIMENTS

Figure 1:
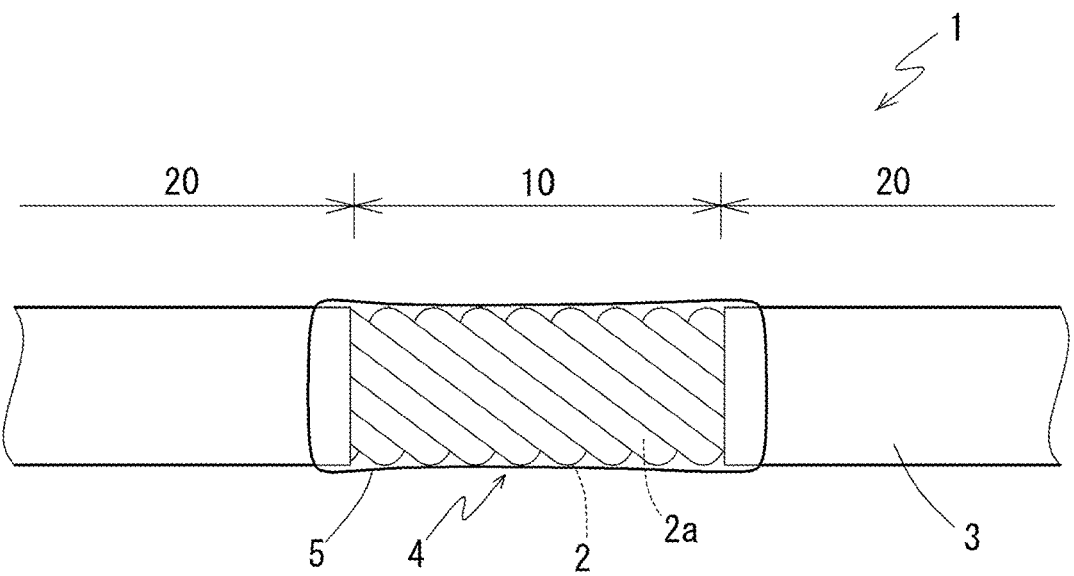
FIG. 1 is a perspective side view illustrating an insulated electric wire according to an embodiment of the present invention.

Description of Embodiments of the Present Disclosure

First, embodiments of the present disclosure will be listed and described.

An insulated electric wire according to the present disclosure contains: a conductor in which a plurality of elemental wires made of a metal material are twisted together; and an insulation covering that covers an outer circumference of the conductor, wherein the insulated electric wire contains: an exposed portion in which the insulation covering is removed from the outer circumference of the conductor; a covered portion in which the insulation covering covers the outer circumference of the conductor, the exposed portion and the covered portion being provided adjacent to each other in a longitudinal axis direction of the insulated electric wire; and a water-stopping portion in which a water-stopping agent is placed over the exposed portion and an area of the covered portion that is adjacent to the exposed portion, and the water-stopping portion contains: a filled area between the elemental wires in which gaps between the elemental wires in the exposed portion are filled with the water-stopping agent; an exposed portion outer circumferential area in which the water-stopping agent covers the outer circumference of the conductor in the exposed portion; and a covered portion outer circumferential area in which the water-stopping agent covers an outer circumference of the insulation covering in the area of the covered portion that is adjacent to the exposed portion, the filled area between the elemental wires, the exposed portion outer circumferential area, and the covered portion outer circumferential area being continuous with each other, and a layer thickness of the water-stopping agent being larger in the exposed portion outer circumferential area than in the covered portion outer circumferential area.

The above-described insulated electric wire contains, as a continuous water-stopping portion, three areas, namely, the filled area between the elemental wires in which the gaps between the elemental wires of the conductor exposed in the exposed portion are filled with the water-stopping agent, the exposed portion outer circumferential area in which the water-stopping agent covers the outer circumference of the conductor in the exposed portion, and the covered portion outer circumferential area in which the water-stopping agent covers an end area of the covered portion. Since, in the covered portion outer circumferential area, the water-stopping agent is in contact with and covers the outer circumferential surface of the insulation covering, the water-stopping portion is likely to be held firmly at the covered electric wire, compared to a case where a water-stopping portion only contains a filled area between the elemental wires and an exposed portion outer circumferential area, and even if a mechanical load such as bending is applied to the electric wire, the water-stopping portion is likely to maintain its water-stopping performance. Furthermore, since the layer thickness of the water-stopping agent is larger in the exposed portion outer circumferential area than in the covered portion outer circumferential area, the layer of the water-stopping agent that constitutes the exposed portion outer circumferential area has a high strength, and even if a mechanical load is applied, the load is unlikely to be transmitted to the exposed portion outer circumferential area or the filled area between the elemental wires, and the exposed portion is likely to maintain a superior water-stopping performance. For example, if the insulated electric wire is bent, the bending is unlikely to be added to a position of the exposed portion due to the presence of a thick layer of the water-stopping agent in the exposed portion outer circumferential area. As a result, it is possible to prevent a reduction in the water-stopping performance in the exposed portion that may occur due to the effect of the bending.

Here, preferably, the layer thickness of the water-stopping agent in the covered portion outer circumferential area is smaller than a thickness of the insulation covering. With this arrangement, the covered portion is kept bendable without interfering with the layer of the water-stopping agent, making it easy to maintain a state in which if the insulated electric wire is bent in the water-stopping portion or the vicinity thereof, the bending will be absorbed by the covered portion, and cannot be applied to the exposed portion. As a result, it is possible to keep the water-stopping performance of the exposed portion high.

Preferably, the water-stopping agent has an elasticity modulus higher than that of the insulation covering. When the water-stopping agent has a high elasticity modulus, this means that the material constituting the water-stopping portion is hard, and is unlikely to be subjected to a mechanical deformation such as bending. Accordingly, when the insulated electric wire is bent in the water-stopping portion or the vicinity thereof, the covered portion is preferentially bent, and the exposed portion is likely to be kept unbent. As a result, the exposed portion is likely to maintain a superior water-stopping performance.

Preferably, the elasticity modulus of the water-stopping agent is not greater than twice the elasticity modulus of the insulation covering. With this arrangement, it is easy to avoid situations where the insulated electric wire as a whole is mishandled due to a too high elasticity modulus of the water-stopping agent, and where upon application of bending or the like, damage may occur at an interface between the water-stopping agent and the insulation covering due to a too large difference in elasticity modulus between the water-stopping agent and the insulation covering.

Preferably, the water-stopping portion has, at an end of the covered portion outer circumferential area that corresponds to an end of the entire water-stopping portion in the longitudinal axis direction, a tapered structure in which a layer of the water-stopping agent becomes thinner outward in the longitudinal axis direction. With this arrangement, even if a mechanical load such as bending is applied to the insulated electric wire, a stress is unlikely to concentrate on the end of the water-stopping portion, making it easy to maintain a state in which the water-stopping agent adheres to the insulation covering. As a result, a superior water-stopping performance is likely to be maintained.

Preferably, an outer circumferential surface of the water-stopping portion except for end portions in the longitudinal axis direction does not have any difference in height that is equal to or greater than the layer thickness of the water-stopping agent in the covered portion outer circumferential area. With this arrangement, the outer circumferential surface of the water-stopping portion has a linear structure, rather than a largely inclined structure or a recess/projection structure. As a result, even if a mechanical load is applied to the water-stopping portion, a large load does not concentrate on a specific position, and the water-stopping portion as a whole is likely to maintain a superior water-stopping performance.

A wire harness according to the present disclosure contains the above-described insulated electric wire. The wire harness according to the present disclosure contains the insulated electric wire whose water-stopping performance is unlikely to be impaired by a mechanical load as described above, and the wire harness as a whole can maintain a superior water-stopping performance even in a situation in which a mechanical load such as bending is applied.

Details of Embodiments of Present Disclosure

Figure 2:
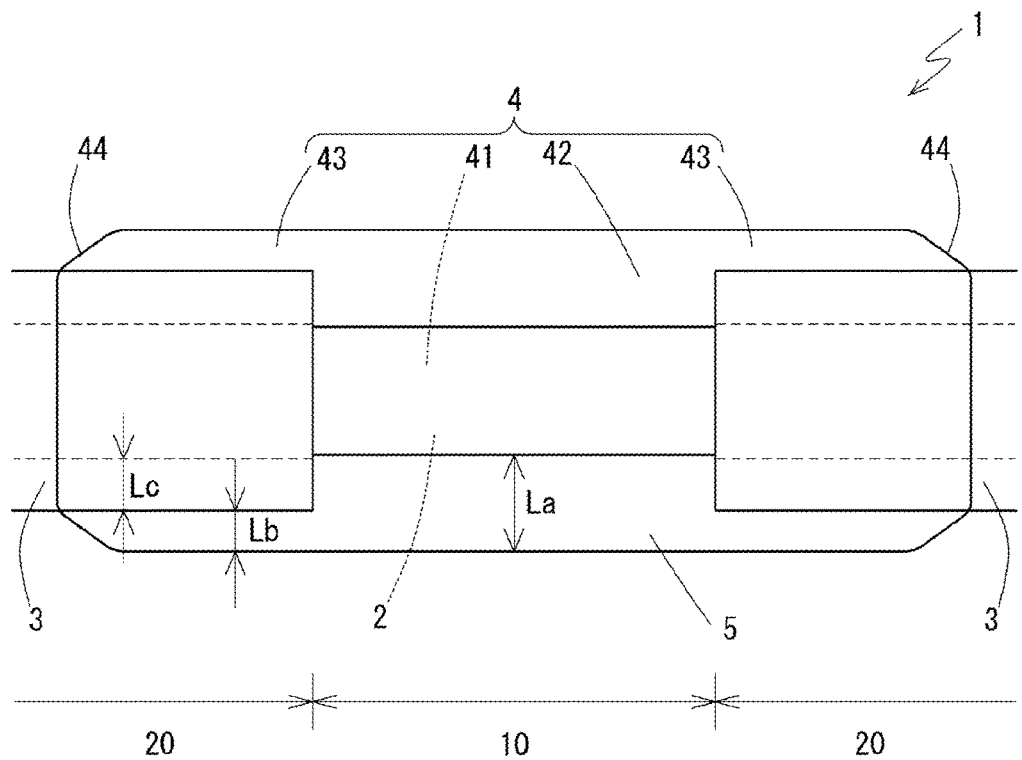
FIG. 2 is a perspective side view illustrating the size and shape of a water-stopping portion with an emphasis on a preferred configuration. Here, illustration of elemental wires that constitute a conductor is omitted.
Figure 3A:
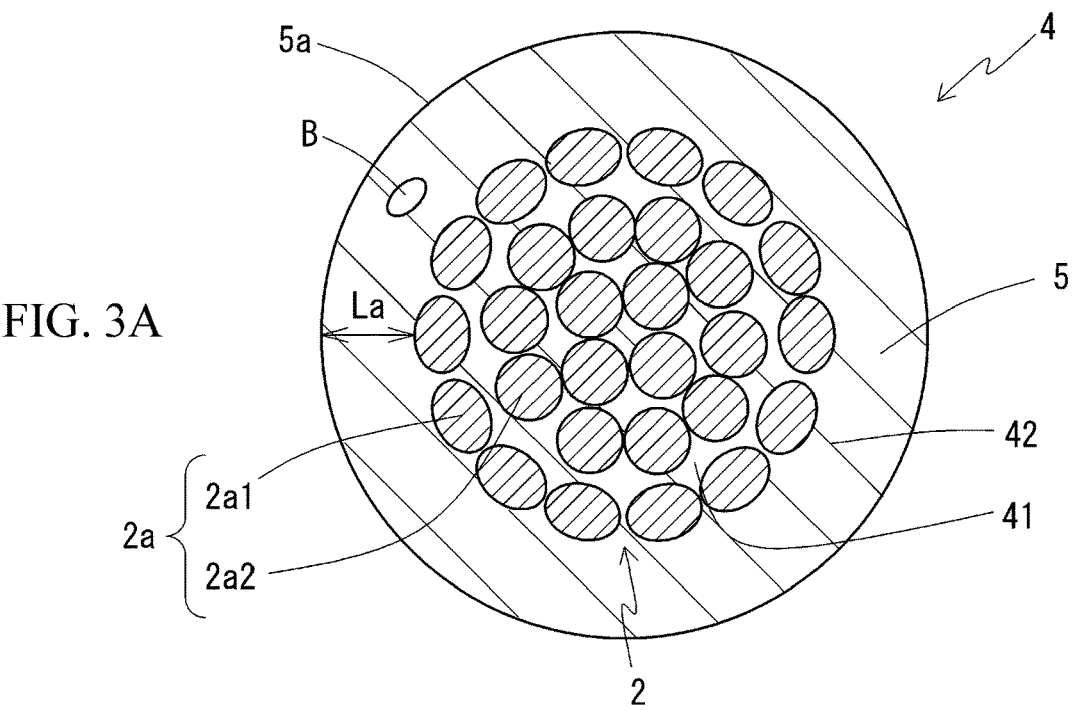
FIG. 3 is a cross-sectional view illustrating an example of a cross-sectional state of the water-stopping portion.
Figure 3B:
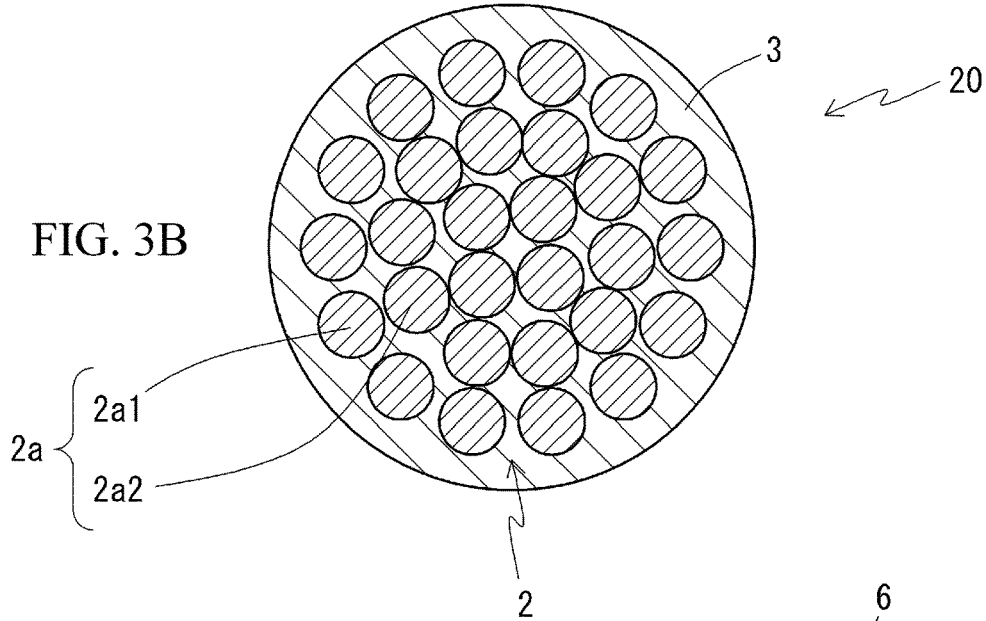

A detailed description of an insulated electric wire and a wire harness according to an embodiment of the present disclosure will now be provided with reference to the drawings.
[Configuration of Insulated Electric Wire]
Overview of Insulated Electric Wire FIG. 1 illustrates an overview of an insulated electric wire 1 according to an embodiment of the present disclosure. FIG. 2 shows a water-stopping portion 4 of the insulated electric wire 1 with an emphasis on a preferred configuration. FIG. 3 shows an example of a cross section of the water-stopping portion 4 taken perpendicular to an axial direction of the insulated electric wire 1.

The insulated electric wire 1 according to an embodiment of the present disclosure contains a conductor 2 obtained by twisting together a plurality of elemental wires 2a made of a metal material, and an insulation covering 3 that covers the outer circumference of the conductor 2. A water-stopping portion 4 is formed in a middle portion of the insulated electric wire 1 in a longitudinal axis direction thereof.

The elemental wires 2a constituting the conductor 2 may be made of any kind of metal material, and metal materials such as copper, aluminum, magnesium, and iron may be used. The metal material may be an alloy. Examples of added metal elements that can be used to form an alloy include iron, nickel, magnesium, silicon, and combinations thereof. All of the elemental wires 2a may be made of the same metal material, or elemental wires 2a made of multiple metal materials may be mixed in combination.

There is no particular limitation to the twist structure of the elemental wires 2a of the conductor 2, but a simple twist structure is preferable in view of, for example, easily increasing distances between the elemental wires 2a when the water-stopping portion 4 is formed. For example, a twist structure in which the elemental wires 2a are collectively twisted all together is preferred rather than a master-slave twist structure in which a plurality of strands each containing a plurality of twisted elemental wires 2a are gathered and further twisted. Also, there is no particular limitation to the diameter of the whole conductor 2 and the diameter of each elemental wire 2a. However, the effect and significance of filling minute gaps between the elemental wires 2a in the water-stopping portion 4 with the water-stopping agent 5 to improve reliability of the water-stopping characteristic is greater as the diameters of the whole conductor 2 and each elemental wire 2a are smaller, and thus it is preferable that the cross section of the conductor be about 8 $mm^2$ or smaller and the diameter of individual elemental wires be about 0.45 mm or smaller.

There is no particular limitation to the material constituting the insulation covering 3, as long as it is an insulating polymer material. Examples of such materials include a polyvinyl chloride (PVC) resin and an olefin-based resin. In addition to the polymer material, a filler or an additive may be contained as appropriate. Further, the polymer material may be cross-linked.

The water-stopping portion 4 includes an exposed portion 10 in which the insulation covering 3 is removed from the outer circumference of the conductor 2. In the exposed portion 10, gaps between the elemental wires 2a constituting the conductor 2 are filled with the water-stopping agent 5, and a filled area 41 between the elemental wires is formed.

Furthermore, the water-stopping portion 4 includes an exposed portion outer circumferential area 42 in which the water-stopping agent 5 covers the outer circumference of the conductor 2 in the exposed portion 10, continuously from the filled area 41 between the elemental wires in which the gaps between the elemental wires 2a in the exposed portion 10 are filled with the water-stopping agent 5. In addition, the water-stopping portion 4 includes covered portion outer circumferential areas 43 that are continuous with the filled area 41 between the elemental wires and the exposed portion outer circumferential area 42. The covered portion outer circumferential areas 43 are obtained by the water-stopping agent 5 covering the outer circumferences of end portions of covered portions 20 adjacent to both sides of the exposed portion 10, that is, the water-stopping agent 5 covering areas that are adjacent to the exposed portion 10 and in which the insulation covering 3 covers the outer circumference of the conductor 2. That is to say, in the water-stopping portion 4, water-stopping agent 5 continuously covers the outer circumference, preferably the entire outer circumference, of an area extending from a part of the end portion of the covered portion 20 located on one side of the exposed portion 10 to a part of the end portion of the covered portion 20 located on the other side. Further, the water-stopping agent 5 fills up the areas between the elemental wires 2a in the exposed portion 10, continuously from that outer circumferential portion. The structure of the water-stopping portion 4 will be described in detail later.

There is no particular limitation to the constituent material of the water-stopping agent 5 as long as it is an insulating material through which a fluid such as water is unlikely to pass and that can exhibit a water-stopping performance. However, the water-stopping agent 5 is preferably made of an insulating resin composition, specifically, a thermoplastic resin composition or a curable resin composition in view of easiness in filling the gaps between the elemental wires 2a in a high flowability state, and the like. By placing such a resin composition in a high flowability state between the elemental wires 2a and on the outer circumferences of the exposed portion 10 and the end portions of the covered portions 20, and then bringing the resin composition to a low flowability state, it is possible to reliably form a water-stopping portion 4 having a superior water-stopping performance. A preferred embodiment of the constituent material of the water-stopping agent 5 will be described later.

As described above, since the water-stopping agent 5 is placed in the gaps between the elemental wires 2a in the exposed portion 10 to constitute the filled area 41 between the elemental wires 2a, water stopping is realized at the areas between the elemental wires 2a, and a fluid such as water is prevented from entering the areas between the elemental wires 2a from the outside. Also, even if water enters a gap between the elemental wires 2a in one portion of the insulated electric wire 1, the water is prevented from moving to another portion of the insulated electric wire 1 along the elemental wires 2a. For example, water adhering to one end of the insulated electric wire 1 can be prevented from moving toward the other end of the insulated electric wire 1 through a gap between the elemental wires 2a.

The exposed portion outer circumferential area 42 in which the water-stopping agent 5 covers the outer circumferential portion of the conductor 2 in the exposed portion 10 plays a role of physically protecting the exposed portion 10. In addition, if the water-stopping agent 5 is made of an insulating material, the exposed portion outer circumferential area 42 plays a role of insulating the conductor 2 in the exposed portion 10 from the outside. Also, when the water-stopping portion 4 has the covered portion outer circumferential areas 43 in which the water-stopping agent 5 also covers the outer circumferences of the end portions of the covered portions 20 adjacent to the exposed portion 10 as one piece, water-stopping is possible between the insulation covering 3 and the conductor 2. That is to say, a fluid such as water is prevented from entering the gap between the insulation covering 3 and the conductor 2 from the outside. Also, even if water enters a gap between the insulation covering 3 and the conductor 2 in one portion of the insulated electric wire 1, the water is prevented from moving to another portion of the insulated electric wire 1 through the gap between the insulation covering 3 and the conductor 2. For example, water adhering to one end of the insulated electric wire 1 can be prevented from moving toward the other end of the insulated electric wire 1 through the gap between the insulation covering 3 and the conductor 2. Since the water-stopping portion 4 contains the covered portion outer circumferential areas 43 that are continuous with the filled area 41 between the elemental wires and the exposed portion outer circumferential area 42, the water-stopping portion 4 as a whole can have a high mechanical strength, and the insulated electric wire 1 can easily and reliably have a water-stopping structure using the water-stopping portion 4. As a result, even if a mechanical load such as bending is applied to the insulated electric wire 1, the water-stopping structure of the water-stopping portion 4 can be maintained firmly.

In the present embodiment, the water-stopping portion 4 is provided in a middle portion of the insulated electric wire 1 in the longitudinal axis direction thereof in view of the magnitude of demand, easiness in increasing the distances between the elemental wires 2a, and the like. However, the same water-stopping portion 4 may also be provided at an end portion of the insulated electric wire 1 in the longitudinal axis direction thereof. In this case, another member such as a terminal may be connected to the end portion of the insulated electric wire 1, or no member may be connected thereto. The water-stopping portion 4 covered with the water-stopping agent 5 may contain, in addition to the conductor 2 and the insulation covering 3, another member such as a connection member. Examples of the case where the water-stopping portion 4 contains another member include a case where the water-stopping portion 4 includes a splice portion in which a plurality of insulated electric wires 1 are joined to each other.

A protection member such as a tube or a tape made of a resin material may also be provided on the outer circumference of the water-stopping portion 4. By providing the protection member, it is possible to protect the water-stopping portion 4 from a physical stimulus such as contact with an external object. Also, if the water-stopping agent 5 is made of a curable resin for example, the water-stopping agent 5 is subjected to aging, and may be damaged when the water-stopping portion 4 is bent or vibrated. However, if a protection member is provided on the outer circumference of the water-stopping portion 4, such damages can be reduced. In view of effectively reducing the effects of bending or vibration on the water-stopping portion 4, the protection member is preferably made of a material that at least has higher rigidity than that of the water-stopping agent 5 that constitutes the water-stopping portion 4. The protection member can be arranged, for example, by winding a tape material having an adhesive layer around the outer circumference of the insulated electric wire 1 including the water-stopping portion 4 in a spiral shape.

Constituent Material of Water-Stopping Agent

As described above, in the insulated electric wire 1 according to the present embodiment, the water-stopping agent 5 constituting the water-stopping portion 4 is preferably made of a curable resin composition. A curable resin composition is a resin composition having one or more of types of curability such as heat curability, light curability, moisture curability, two-component curability, and anaerobic curability. In view of excellence in rapid curability or the like, the water-stopping agent 5 preferably has light curability or anaerobic curability, and more preferably has both of these types of curability.

There is no particular limitation to the specific type of the resin constituting the water-stopping agent 5. Examples of the resin include a silicone resin, an acrylic resin, an epoxy resin, and a urethane resin. Various kinds of additives can be appropriately added to the resin material, as long as the properties of the resin material as the water-stopping agent 5 are not deteriorated. Also, only one type of water-stopping agent 5 is preferably used in view of simplicity of the configuration, but two or more types of water-stopping agent 5 may also be mixed in combination or stacked, for example, as appropriate.

It is preferable that the water-stopping agent 5 be a resin composition having a viscosity of 4000 mPa·s or higher, more preferably 5000 mPa·s or higher, still more preferably 10,000 mPa·s or higher at the time of filling. This is because, when the water-stopping agent 5 is placed at the areas between the elemental wires 2a and on the outer circumferential areas, especially on the outer circumferential areas, the water-stopping agent 5 hardly drops or flows and is likely to stay in these areas with high uniformity. On the other hand, it is preferable that the viscosity of the water-stopping agent 5 at the time of filling be kept at 200,000 mPa·s or lower. This is because, when the viscosity is too high, the water-stopping agent 5 is unlikely to sufficiently permeate into the areas between the elemental wires 2a.

Also, the water-stopping agent 5 in its cured state preferably has a higher elasticity modulus than the insulation covering 3. When the water-stopping agent 5 has a high elasticity modulus, this means that the water-stopping agent 5 is hard and is unlikely to mechanically deform. Accordingly, by providing the water-stopping agent 5 with a higher elasticity modulus than that of the insulation covering 3, if a mechanical load is applied to the insulated electric wire 1, the load is unlikely to be transmitted to the water-stopping portion 4, and the water-stopping portion 4 is likely to maintain its water-stopping performance. For example, when the insulated electric wire 1 is bent in the vicinity of the water-stopping portion 4, the water-stopping portion 4 is not bent, but the covered portions 20 that are not covered by the water-stopping agent 5 are likely to be bent. Here, the elasticity moduli of the water-stopping agent 5 and the insulation covering 3 can be evaluated as flexural moduli of elasticity, and can be measured by a bending test according to JIS K 7171: 2016, for example.

More preferably, the elasticity modulus of the water-stopping agent 5 is at least 1.2 times as large as the elasticity modulus of the insulation covering. There is no particular limitation to the specific elasticity modulus of the water-stopping agent 5, but the flexural modulus of elasticity at room temperature may be preferably 200 MPa or higher, and further preferably 220 MPa or higher.

The harder the water-stopping agent 5 is, the more likely the effect of a mechanical load on the water-stopping performance is reduced, and thus there is no particular upper limit on the elasticity modulus of the water-stopping agent 5. However, if the water-stopping agent 5 is too hard, the handling of the insulation covering 3 as a whole when the insulated electric wire is bent and routed, for example, may be reduced, and damage such as a crack or bending is even more likely to occur at an interface with the insulation covering 3 or the vicinity thereof, and thus it is preferable that the elasticity modulus of the water-stopping agent 5 be kept at a value that is not greater than twice the elasticity modulus of the insulation covering 3. Also, it is preferable that the elasticity modulus of the water-stopping agent 5 be kept such that the flexural modulus of elasticity at room temperature is about 300 MPa or lower.

Configuration of Water-Stopping Portion

The following will describe a configuration of the water-stopping portion 4 based on a preferred embodiment.

(1) Outer Shape and Thickness of Outer Circumferential Area

First, a preferred embodiment regarding the outer shape of the water-stopping portion 4 as a whole, and layer thicknesses of the water-stopping agent 5 in the exposed portion outer circumferential area 42 and the covered portion outer circumferential areas 43 will be described with reference to FIG. 2.

In the water-stopping portion 4 of the insulated electric wire 1 according to the present embodiment, a layer thickness La of the water-stopping agent 5 in the exposed portion outer circumferential area 42 is larger than a layer thickness Lb of the water-stopping agent 5 in the covered portion outer circumferential areas 43 (La>Lb). The larger the layer thickness of the water-stopping agent 5 is, the higher the material strength of the layer of the water-stopping agent 5 is. Thus, it is unlikely that a mechanical load such as bending is applied to the water-stopping portion 4, and even if a mechanical load is applied, the effect thereof can be suppressed. Accordingly, since the layer thickness of the water-stopping agent 5 is larger in the exposed portion outer circumferential area 42 than in the covered portion outer circumferential areas 43, the water-stopping performance of the water-stopping portion 4 is unlikely to be affected by a mechanical load at a position in the exposed portion 10. For example, when bending is applied to the water-stopping portion 4 or an area in the vicinity thereof, the portion of the water-stopping portion 4 that corresponds to the exposed portion 10 is less likely to be bent.

As a result, the water-stopping agent 5 that constitutes the filled area 41 between the elemental wires or the exposed portion outer circumferential area 42 is unlikely to be subjected to damage such as a crack due to a bending load, and a superior water-stopping performance is maintained. Even if bending is applied to portions of the water-stopping portion 4 that correspond to the covered portions 20 and the water-stopping agent 5 in the corresponding portions is damaged, the water-stopping performance of the water-stopping portion 4 cannot be affected so much. However, if bending is applied to the water-stopping portion 4 at a position of the exposed portion 10, and the water-stopping agent 5 that constitutes the filled area 41 between the elemental wires and the exposed portion outer circumferential area 42 is damaged, it will be difficult to sufficiently prevent entry of water into the gaps between the elemental wires 2a, and the water-stopping performance of the water-stopping portion 4 will be likely to be affected largely. Therefore, by setting the layer thickness of the water-stopping agent 5 to be larger in the exposed portion outer circumferential area 42 than in the covered portion outer circumferential areas 43, it is possible to preferentially protect a position of the exposed portion 10 at which the water-stopping performance may be affected more seriously by a mechanical load such as bending, from application of such a mechanical load. It is furthermore preferable that the layer thickness La of the water-stopping agent 5 in the exposed portion outer circumferential area 42 be at least 1.5 times the layer thickness Lb of the water-stopping agent 5 in the covered portion outer circumferential areas 43.

Furthermore, it is preferable that the layer thickness Lb of the water-stopping agent 5 in the covered portion outer circumferential areas 43 be smaller than a thickness Lc of the insulation covering 3 (Lb<Lc). The smaller the layer thickness of the water-stopping agent 5 is, the more likely the insulated electric wire 1 is to bend at the corresponding position. Thus, when the layer of the water-stopping agent 5 provided on the outer circumference of the insulation covering 3 in each of the covered portion outer circumferential areas 43 is formed so as to be thinner than the layer of the insulation covering 3, the layer of the water-stopping agent 5 is unlikely to interfere with the flexibility of the insulation covering 3, and thus the water-stopping portion 4 is likely to bend in the areas of the corresponding covered portions 20. Based on the effect together with the above-described effect that the layer thickness of the water-stopping agent 5 is larger in the exposed portion outer circumferential area 42 than in the covered portion outer circumferential areas 43 (La>Lb), if bending is applied to the insulated electric wire 1 at a position of the water-stopping portion 4, the water-stopping portion 4 is likely to bend in the covered portions 20 rather than in the exposed portion 10. In this way, with this configuration in which bending applied to the water-stopping portion 4 is absorbed by the covered portion outer circumferential areas 43 so that the filled area 41 between the elemental wires and the exposed portion outer circumferential area 42 are unlikely to bend, it is easy to prevent a situation where damage such as a crack due to bending occurs in the water-stopping agent 5 in the filled area 41 between the elemental wires and the exposed portion outer circumferential area 42, which have the particularly essential functions in the water-stopping for the conductor 2, and a sufficient water-stopping performance cannot be maintained. It is furthermore preferable that the layer thickness Lb of the water-stopping agent 5 in the covered portion outer circumferential areas 43 is 80% or lower of the thickness Lc of the insulation covering 3.

As the overall shape of the water-stopping portion 4, the water-stopping portion 4 preferably has tapered portions 44 at both ends in the longitudinal axis direction. That is to say, the water-stopping portion 4 preferably has, at the ends of the covered portion outer circumferential areas 43 that correspond to the ends of the entire water-stopping portion 4, a tapered structure in which the layer of the water-stopping agent 5 is thinner toward the outside in the longitudinal axis direction (opposite to the exposed portion 10). When such tapered portions 44 are formed, the water-stopping agent 5 constituting the water-stopping portion 4 is likely to firmly adhere to the outer circumferential surface of the insulation covering 3. Accordingly, the state in which the water-stopping portion 4 has a superior water-stopping performance is likely to be maintained. Specifically, even if a mechanical load such as bending is applied to the insulated electric wire 1 at the water-stopping portion 4 or the vicinity thereof, a stress is unlikely to concentrate on the ends of the water-stopping portion 4 due to the presence of the tapered portions 44, and the layers of the covered portion outer circumferential areas 43 are unlikely to be removed from the surface of the insulation covering 3. As a result, it is possible to prevent a reduction in the water-stopping performance due to an effect of the load.

Furthermore, the water-stopping portion 4 preferably has a linear shape in the longitudinal axis direction except for a partial area at the ends in the longitudinal axis direction, such as the tapered portions 44. That is, an outer surface shape of the water-stopping portion 4 may be approximate to a straight tube. As a result of the water-stopping portion 4 having a linear shape, it is easy to avoid a situation where a mechanical load concentrates on a specific position of the water-stopping portion 4, and damage such as a crack advances at the position. Accordingly, the water-stopping portion 4 as a whole is likely to maintain a superior water-stopping performance. An example of a preferable indicator for the water-stopping portion 4 having a linear shape is such that the outer circumferential surface of the water-stopping portion 4 has no structural difference in height that is equal to or greater than the layer thickness Lb of the water-stopping agent 5 in the covered portion outer circumferential areas 43. Examples of structures that may cause a difference in height of the outer circumferential surface of the water-stopping portion 4 can include structures with recesses/projections and inclined surface structures, and if none of such structures are formed or a difference in height is suppressed, concentrated application of mechanical loads will likely be avoided. Preferably, no difference in height is formed that is greater than or equal to 20% of the layer thickness Lb of the water-stopping agent 5 in the covered portion outer circumferential areas 43.

(2) State of Conductor in Water-Stopping Portion

The following will describe a preferred embodiment regarding the conductor 2 surrounded by the water-stopping agent 5 in the water-stopping portion 4. As described above, in the water-stopping portion 4 of the insulated electric wire 1 according to the present embodiment, the water-stopping agent 5 permeates between the elemental wires 2a of the conductor 2 exposed as the exposed portion 10, and is cured. The state of the conductor 2 constituting the exposed portion 10 may be the same as the state of the conductor 2 in the covered portions 20 covered by the insulation covering 3, but it is advantageous that the states are different from each other for allowing the water-stopping agent 5 to permeate and stay between the elemental wires 2a.

First, in the insulated electric wire 1, preferably, the density of the metal material per unit length (per unit length of the insulated electric wire 1 in the longitudinal axis) is not uniform and has a nonuniform distribution. Each of the elemental wires 2a is defined as a wire having a substantially uniform diameter continuously along the entire longitudinal axis of the insulated electric wire 1. In the present specification, the state where the density of the metal material per unit length is different between areas is defined as a state where the diameter and the number of the elemental wires 2a are constant, but the state of assembly of the elemental wires 2a such as the state of twist of the elemental wires 2a is different.

Specifically, it is preferable that the density of the metal material of the conductor 2 per unit length be higher in the exposed portion 10 than in the covered portions 20. However, the density of the metal material per unit length may be partially lower in adjacent areas 21 of the covered portions 20 that are directly adjacent to the exposed portion 10 than in the exposed portion 10. In other words, the density of the metal material per unit length is higher in the exposed portion 10 than at least in remote areas 22 of the covered portions 20 other than the adjacent areas 21. In the remote areas 22, the state of the conductor 2 such as the density of the metal material per unit length is substantially equal to the state of the insulated electric wire 1 in which no water-stopping portion 4 is formed. Possible reasons why the density of the metal material can be reduced in the adjacent areas 21 include that the metal material is shifted to the exposed portion 10, and that the conductor 2 is deformed to ensure the continuation between the exposed portion 10 and the covered portions 20.

Figure 8:
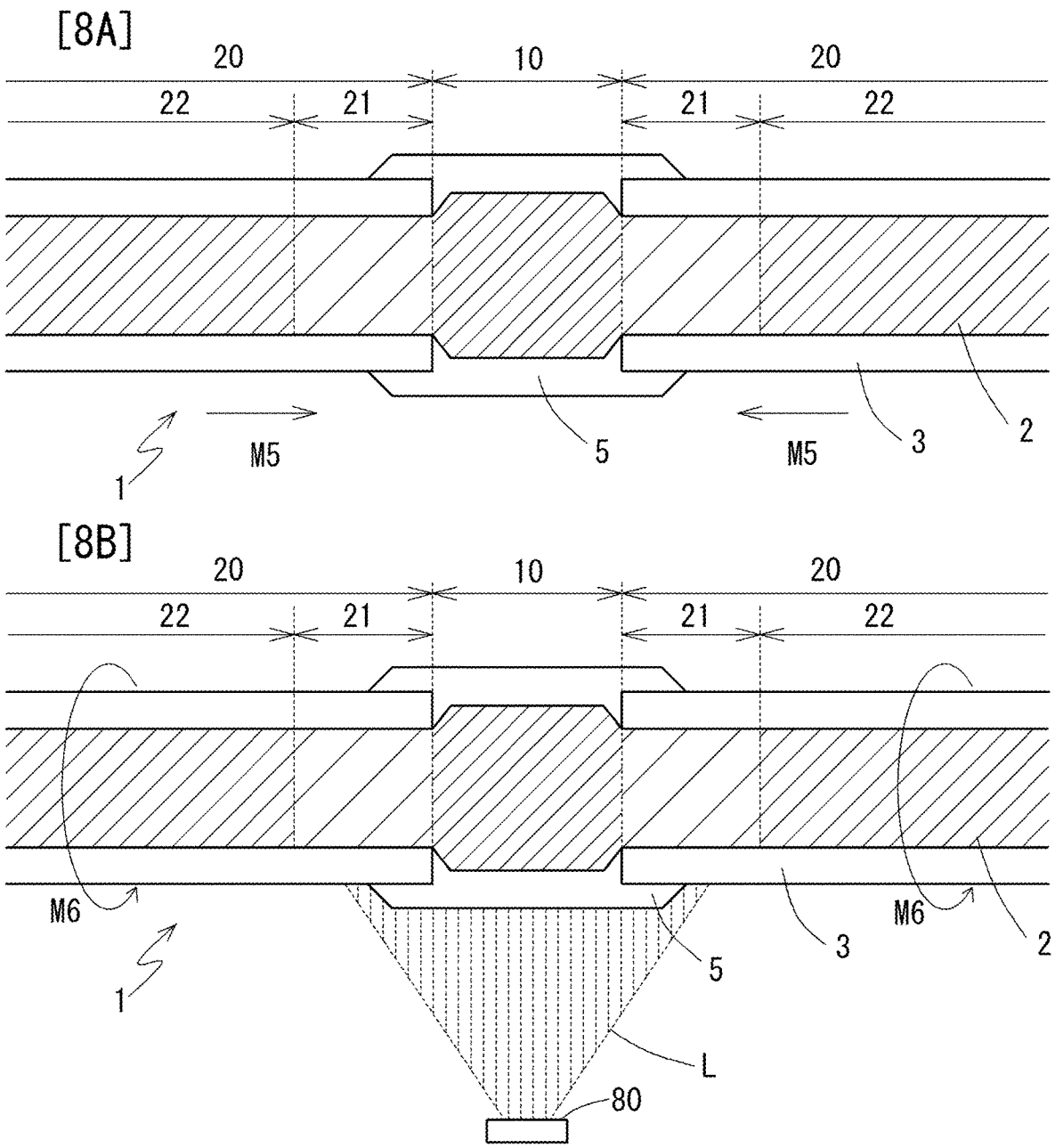
FIGS. 8A and 8B are cross-sectional views of the insulated electric wire, illustrating steps for producing the insulated electric wire.

FIG. 8B schematically illustrates a state of the conductor 2 having the density distribution of the metal material as described above. In FIGS. 6A to 8B, the area inside the conductor 2 is hatched, and the higher the density of hatching is, the smaller the twist pitch of the elemental wires 2a is, that is, the smaller the distances between the elemental wires 2a are. Further, the larger the width (vertical length) of the area representing the conductor 2 is, the larger the diameter of the conductor 2 is. Those parameters in the drawings only schematically show the relative relationship of the sizes between the areas, and are not proportional to the twist pitch of the elemental wires 2a or the diameter of the conductor 2. Furthermore, the parameters in the drawings are discontinuous between different regions, but in the actual insulated electric wire 1, the state of the conductor 2 changes continuously between these regions.

By increasing the density of the metal material per unit length in the exposed portion 10 and the actual length of the elemental wires 2a included per unit length, it is possible to realize a state in which the elemental wires 2a are loosened, the distances between the elemental wires 2a are increased, and large gaps between the elemental wires 2a are secured, and thus the water-stopping agent 5 can permeate the gaps between the elemental wires 2a in this state, as will be described in detail later as a method for producing the insulated electric wire 1. As a result, the water-stopping agent 5 is more likely to permeate the gaps between the elemental wires 2a, and thus every part of the exposed portion 10 can be filled with the water-stopping agent 5 easily and highly uniformly. In FIG. 8B, for ease of understanding of a change in the density of the metal material, a state in which the diameter of the conductor 2 is larger in the exposed portion 10 than in the remote areas 22 of the covered portions 20 is shown, but the conductor diameter in the exposed portion 10 is not necessarily large, and it is rather preferable that the conductor diameter in the exposed portion 10 be the same as the conductor diameter in the covered portions 20, in view of downsizing the water-stopping portion 4, as shown in FIG. 2.

Furthermore, it is preferable that the twist pitch of the elemental wires 2a be smaller in the exposed portion 10 than the twist pitch in the remote areas 22 of the covered portions 20, in addition to the density of the metal material per unit length that is higher in the exposed portion 10 than in the remote areas 22 of the covered portions 20. This is because the fact that the twist pitch of the elemental wires 2a is smaller in the exposed portion 10 and the distances between the elemental wires 2a are smaller in the exposed portion 10 also brings about an effect of improving the water-stopping performance. That is to say, if the distances between the elemental wires 2a are reduced during formation of the water-stopping portion 4 in which the gaps between the elemental wires 2a are filled with the water-stopping agent 5 in a liquid state, the water-stopping agent 5 is likely to stay in the gaps between the elemental wires 2a uniformly without dropping or flowing. If the water-stopping agent 5 is cured from this state, a superior water-stopping performance can be obtained in the exposed portion 10. Also, as a result of the twist pitch being smaller in the exposed portion 10 than in the remote areas 22, it is possible to suppress the conductor diameter in the exposed portion 10 so as not to become too large when compared to the conductor diameter of the remote areas 22, even if the density of the metal material per unit length is higher in the exposed portion 10 than in the remote areas 22. Accordingly, the outer diameter of the entire water-stopping portion 4 can be made substantially the same as the outer diameter of the insulated electric wire 1 in the remote areas 22, or can be suppressed so as not to be much larger than that in the remote areas 22.

(3) State of Cross Section of Water-Stopping Portion in Exposed Portion

The following will describe a preferred embodiment of a cross-sectional structure of an area of the water-stopping portion 4 that corresponds to the exposed portion 10. As described above, the water-stopping portion 4 of the insulated electric wire 1 according to the present embodiment contains the filled area 41 between the elemental wires in which the water-stopping agent 5 is placed in the gaps between the elemental wires 2a constituting the conductor 2 in the exposed portion 10, and the exposed portion outer circumferential area 42 in which the water-stopping agent 5 covers the outer circumference of the conductor 2, and thus the exposed portion 10 has a superior water-stopping performance. The water-stopping performance can be further improved by controlling the state of a cross section of the water-stopping portion 4 in the exposed portion 10. The following will describe a preferred state of a cross section of the water-stopping portion 4 in the exposed portion 10.

As shown in FIG. 3, in an area enclosed by a surface 5a of the water-stopping agent 5 in the water-stopping portion 4, the surface of the elemental wires 2a is preferably in contact with the water-stopping agent 5 or another elemental wire 2a. In other words, preferably, the surface of each elemental wire 2a contained in the conductor 2 is in contact with the water-stopping agent 5 or another elemental wire 2a adjacent to that elemental wire 2a, and is not in contact with any substance other than the water-stopping agent 5 and the constituent material of the elemental wires 2a, such as bubbles B filling a defect portion of the water-stopping agent 5 with air, and liquid bubbles formed as a result of a liquid such as water entering the bubble B. Preferably, the water-stopping agent 5 densely fills up the gaps between the elemental wires 2a and adheres to the surface of the elemental wires 2a without the interposition of any bubble B or the like.

This configuration is unlikely to cause situations where water enters an area between the elemental wires 2a via a bubble B from the outside of the water-stopping portion 4, and where, for example, damage that may serve as an entry path of water occurs due to the bubble B when an external force is applied. Thus, in the water-stopping portion 4, the water-stopping agent 5 adhering to the surfaces of the elemental wires 2a can particularly effectively prevent entry of water into an area between the elemental wires 2a. It is also possible to effectively prevent water that has entered an area between the elemental wires 2a in one portion of the insulated electric wire 1, such as a wire terminal, from moving to another portion of the insulated electric wire 1, such as the covered portion 20, along the elemental wires 2a. In this way, by eliminating bubbles B that are in contact with a elemental wire 2a, in addition to the effect that the layer thickness La of the exposed portion outer circumferential area 42 is larger than the layer thickness Lb of the covered portion outer circumferential areas 43, and the like, it is easy to prevent a reduction of the water-stopping performance due to application of mechanical loads.

Here, the surface of a elemental wire 2a may be in contact with the water-stopping agent 5 or another elemental wire 2a, but a better water-stopping performance can be realized when the surface is in contact with the water-stopping agent 5, because by directly adhering to the elemental wire 2a, the water-stopping agent 5 particularly effectively prevents the elemental wire 2a from coming into contact with water. However, also when the surface of a elemental wire 2a is in contact with another elemental wire 2a, water cannot enter a contact interface between the two adjacent elemental wires 2a that are in contact with each other, and a sufficiently good water-stopping performance can be ensured. Due to the absence of bubbles B that are in contact with the elemental wires 2a, the positional relationship between the adjacent elemental wires 2a hardly changes, and a state in which water cannot enter the contact interface between the adjacent elemental wires 2a is maintained.

The cross section of the water-stopping portion 4 may include bubbles B that are not in contact with any elemental wire 2a but are surrounded over their entire circumference by the water-stopping agent 5, rather than bubbles B that are in contact with a elemental wire 2a. Ideally, it is preferable that no kind of bubble B is included in the area enclosed by the surface 5a of the water-stopping agent 5, but even if there is a bubble B, this will not significantly reduce the water-stopping performance of the water-stopping portion 4 as long as the bubble B is not in contact with a elemental wire 2a. For example, there may be bubbles B whose entire circumference is surrounded by the water-stopping agent 5 on the outer side of the area constituted by the conductors 2. Also, in the configuration shown in FIG. 3, there is such a bubble B whose entire circumference is surrounded by the water-stopping agent 5 on the outer side of the conductor 2.

Note that, as described above, bubbles B that are in contact with a elemental wire 2a are a cause of a reduction in the water-stopping performance, but if, for example, the required level of water-stopping performance is low, the water-stopping performance and the waterproofing performance of the insulated electric wire 1 may not be largely affected despite of the presence of bubbles B that are in contact with a elemental wire 2a, as long as the amount or the size of such bubbles B is small. For example, in a cross section of the water-stopping portion 4, it is preferable that the sum of the cross-sectional areas of bubbles B that are in contact with the elemental wires 2a be 5% or lower of the sum of the cross-sectional areas of the elemental wires 2a. It is also preferable that the cross-sectional area of each bubble B that is in contact with a elemental wire 2a be 80% or lower of the cross-sectional area of one elemental wire 2a. On the other hand, even bubbles B whose entire circumference is surrounded by the water-stopping agent 5 and that are not in contact with a elemental wire 2a may affect the water-stopping performance of the water-stopping portion 4, if they locate close to the elemental wire 2a. Accordingly, it is preferable that a bubble B and a elemental wire 2a be provided at a distance of 30% or higher of the diameter of the elemental wire 2a, and the space therebetween be filled with the water-stopping agent 5.

Furthermore, it is preferable that, in a cross section of the water-stopping portion 4, the elemental wires 2a located in the outer circumferential portion of the conductor 2 have a more flattened shape than the elemental wires 2a located inward thereof. In FIG. 3, elemental wires 2a1 located in the outer circumferential portion of the conductor 2 have a flattened and substantially ellipsoidal cross-section. Elemental wires 2a2 located inward of the elemental wires 2a1, which are located in the outer circumferential portion 2 of the conductor, have a less flattened cross-section. The cross section taken perpendicular to the axial direction of each elemental wires 2a itself is substantially circular, and thus the flattened cross-sectional shape of the water-stopping portion 4 is obtained by the arrangement of the elemental wires 2a in the conductor 2, rather than the cross-sectional shape of each elemental wires 2a itself, as will be described below.

If the elemental wires 2a constituting the conductor 2 are twisted in a gentle spiral shape with a relatively small inclination angle, the axial direction of the elemental wires 2a is oriented in a direction close to the longitudinal axis direction of the insulated electric wire 1, and thus a cross section of the elemental wire 2a taken perpendicular to the longitudinal axis direction of the insulated electric wire 1 has a shape that is substantially circular and is less flattened. By contrast, if the elemental wires 2a constituting the conductor 2 are twisted in a steep spiral shape with a relatively large inclination angle, the axial direction of the elemental wires 2a is oriented in a direction largely inclined with respect to the longitudinal axis direction of the insulated electric wire 1, and thus if a elemental wire 2a is cut perpendicular to the longitudinal axis direction of the insulated electric wire 1, the elemental wire 2a will be cut at an angle with respect to the axis direction of the elemental wire 2a. Accordingly, the cross section of the elemental wire 2a has a flattened shape that can be approximated to an ellipse. Thus, the above description of the elemental wires 2a1 located in the outer circumferential portion of the conductor 2 in the cross section of the water-stopping portion 4 having a more flattened shape than the elemental wires 2a2 located inward thereof means that the elemental wires 2a1 located in the outer circumferential portion of the conductor 2 are twisted in a steep spiral shape with a large inclination angle, compared to the spiral shape of the inner elemental wires 2a2.

As described above, the water-stopping portion 4 can be formed by filling the areas between the elemental wires 2a with the water-stopping agent 5 in a high flowability state, and then decreasing the flowability, and by twisting the elemental wires 2a1 located in the outer circumferential portion of the conductor 2 in a steep spiral state with a large inclination angle with the areas between the elemental wires 2a filled with the water-stopping agent 5 in a high flowability state, the water-stopping agent 5 filling up the areas is unlikely to drop or flow to the outside of the conductor 2, and stay in the areas between the elemental wires 2a with high uniformity. As a result, the areas between the elemental wires 2a are filled with a sufficient amount of water-stopping agent 5, and a water-stopping portion 4 having a superior water-stopping performance is easily formed. Specifically, when, as will be described later as a method for producing the insulated electric wire 1, a production method is used in which the distances between the elemental wires 2a in the exposed portion 10 are increased while unwinding the elemental wires 2a from the covered portions 20 to the exposed portion 10, and in this state, the gaps between the elemental wires 2a are filled with the water-stopping agent 5, and after the filling step, the distances between the elemental wires 2a in the exposed portion 10 are reduced to decrease the twist pitch of the elemental wires 2a (retightening), the cross-sectional shape of the elemental wires 2a1 in the outer circumferential portion of the conductor 2 is likely to be flattened, and thus advantageous in that the water-stopping agent 5 is easily held in the gaps between the elemental wires 2a. Thus, the feature of the elemental wires 2a1 in the outer circumferential portion of the conductor 2 having a flattened cross-sectional shape is an indicator used when a water-stopping portion 4 having a superior water-stopping performance is formed.

An ellipticity can be used as a specific indicator for evaluating the level of flatness of the cross-sectional shape of the elemental wires 2a. The ellipticity is obtained by dividing the length of the short axis (short diameter) of a cross-sectional shape by the length of the long axis (long diameter), i.e. (short diameter/long diameter). The smaller the value of the ellipticity is, the more flattened the cross-sectional shape is. In a cross section of the water-stopping portion 4, the ellipticity of the elemental wires 2a1 located in the outer circumferential portion of the conductor 2 preferably has a value less than the value of the ellipticity of the elemental wires 2a2 located inward thereof. Furthermore, the ellipticity of the elemental wires 2a1 located in the outer circumferential portion of the conductor 2 is preferably 0.95 or lower. This brings about an effect of configuring the water-stopping portion 4 in which a sufficient amount of water-stopping agent 5 is held between the elemental wires 2a, and has a superior water-stopping performance. On the other hand, the ellipticity of the elemental wires 2a1 located in the outer circumferential portion of the conductor 2 is preferably 0.50 or higher. This makes it possible to suppress a difference in the actual length between the elemental wires 2a1 located in the outer circumferential portion of the conductor 2 and the elemental wires 2a2 located inward thereof within a range in which the above-described effect of improving the water-stopping performance is not saturated.

It is preferable that in a cross section of the water-stopping portion 4, the ellipticity of the elemental wires 2a1 located in the outer circumferential portion of the conductor 2 be smaller than the ellipticity of the elemental wires 2a2 located inward thereof, and the ellipticities of the elemental wires 2a1 and 2a2 in a cross section of the water-stopping portion 4, particularly, the ellipticity of the elemental wires 2a1 located in the outer circumferential portion be smaller than the values of the ellipticities of the elemental wires 2a in a cross section of the covered portion 20 (specifically, the remote area 22) that is taken perpendicular to the longitudinal axis direction of the insulated electric wire 1. This means that the twist pitch of the elemental wires 2a is smaller in the exposed portion 10 constituting the water-stopping portion 4 than in the covered portions 20. As described above, with the production method in which the distances between the elemental wires 2a in the exposed portion 10 are increased, and in this state, the gaps between the elemental wires 2a are filled with the water-stopping agent 5, and after the filling step, the distances between the elemental wires 2a in the exposed portion 10 are reduced to decrease the twist pitch of the elemental wires 2a (retightening), an advantageous effect of easily holding the water-stopping agent 5 in the gaps between the elemental wires 2a is realized. Also, by decreasing the twist pitch of the elemental wires 2a in the exposed portion 10 relative to the twist pitch in the covered portions 20 in the retightening step, the effect of holding the water-stopping agent 5 in the gaps between the elemental wires 2a is particularly improved. Accordingly, the feature of the ellipticity of the elemental wires 2a in a cross-section being smaller in the exposed portion 10 than in the covered portion 20 functions as a good indicator for use when the water-stopping portion 4 having a superior water-stopping performance is formed.

Furthermore, a water-stopping agent filling rate can be used as an indicator for evaluating whether or not the gaps between elemental wire 2a in the filled area 41 between the elemental wires of the water-stopping portion 4 are filled with a sufficient amount of water-stopping agent 5. A water-stopping agent filling rate is defined as a ratio of an area (A1) of a region between the elemental wires 2a filled with the water-stopping agent 5 to a sum (A0) of areas of a region constituted by the conductor 2 and a region enclosed by the conductor 2 in a cross section of the water-stopping portion 4 (A1/A0×100%). For example, in a cross section of the water-stopping portion 4, using the area (A0) of the polygonal region obtained by connecting the centers of the elemental wires 2a1 located in the outer circumferential portion of the conductor 2 together as a reference, a water-stopping agent filling rate can be calculated as a ratio of the area (A1) of the region filled with the water-stopping agent 5 to the area (A0). For example, if the water-stopping agent filling rate is 5% or higher, and specifically 10% or higher, it is conceivable that the gaps between the elemental wires 2a are filled with an amount of water-stopping agent 5 that is sufficient for ensuring a superior water-stopping performance. On the other hand, the water-stopping agent filling rate is preferably kept 90% or lower, in view of avoiding the use of an excessive amount of water-stopping agent 5.

Also, as described above, the surface of a elemental wire 2a is preferably not in contact with any bubble B. The surface of a elemental wire 2a may be in contact with the water-stopping agent 5 or may be in contact with another elemental wire 2a, but it is preferable that the surface be in contact only with the water-stopping agent 5 in view of easily ensuring a superior water-stopping performance. Based on this view, in a cross section of the water-stopping portion 4, the sum of the lengths of the portions in the circumference of the elemental wires 2a that are not in contact with any bubble B or adjacent elemental wires 2a but are in contact with the water-stopping agent 5 is preferably 80% or higher of the sum of the circumferential lengths of all the elemental wires 2a. Also, since it is easier to fill a gap between elemental wires 2a with the water-stopping agent 5 when the distance between the adjacent elemental wires 2a is sufficiently large, it is preferable that a cross section of the water-stopping portion 4 include a portion that is constituted by the water-stopping agent 5, and in which the distance between adjacent elemental wires 2a is 30% or higher of the outer diameter of the elemental wires 2a.

[Configuration of Wire Harness]

Figure 4:
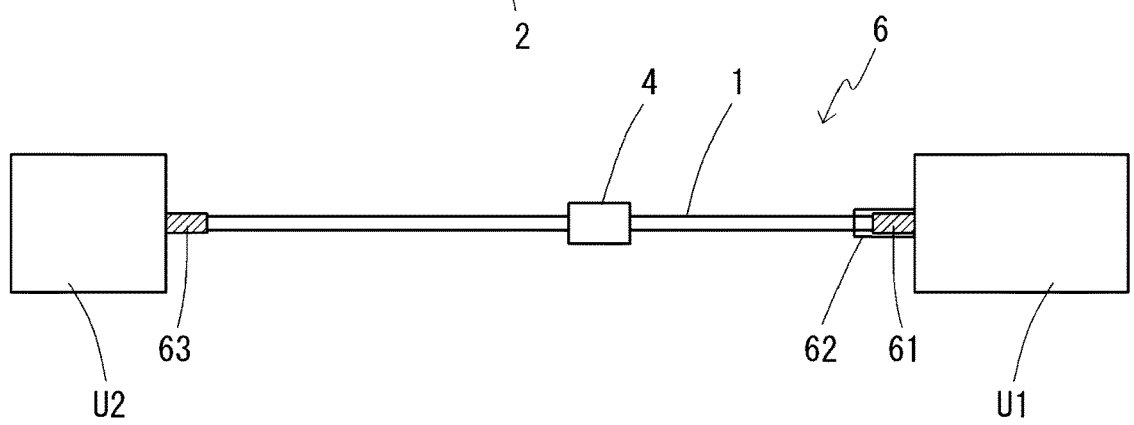
FIG. 4 is a schematic side view illustrating a wire harness according to an embodiment of the present invention, together with devices connected to both ends of the wire harness.

A wire harness 6 according to an embodiment of the present disclosure contains the above-described insulated electric wire 1 with the water-stopping portion 4 according to the embodiment of the present disclosure. FIG. 4 illustrates an example of the wire harness 6 according to the present embodiment. The insulated electric wire 1 constituting the wire harness 6 is provided with, at the respective ends thereof, electric connections 61 and 63 such as connectors that are capable of connecting to other devices U1 and U2. The wire harness 6 may contain, in addition to the above-described insulated electric wire 1 according to the embodiment, another type of insulated electric wire (not shown).

The wire harness 6 may employ any type of electric connections 61 and 63 provided at the respective ends of the insulated electric wire 1, and any type of devices U1 and U2 to which the electric connections 61 and 63 are connected, but an appropriate insulated electric wire 1 is such that one end thereof is waterproof while the other end is not waterproof, in view of efficient use of the water-stopping performance of the water-stopping portion 4.

As such an embodiment, the first electric connection 61 provided at one end of the insulated electric wire 1 contains a waterproof structure 62, as shown in FIG. 4. An example of the waterproof structure 62 is such that the connector constituting the first electric connection 61 is provided with a rubber stopper for sealing a space between a connector housing and a connector terminal. With the waterproof structure 62, even if water adheres to the surface or the like of the first electric connection 61, the water is unlikely to enter the first electric connection 61.

On the other hand, the second electric connection 63 provided at the other end of the insulated electric wire 1 does not contain a waterproof structure as included in the first electric connection 61. Accordingly, if water adheres to the surface or the like of the second electric connection 63, the water may enter the second electric connection 63.

The exposed portion 10 in which the conductor 2 is exposed is formed in a middle portion of the insulated electric wire 1 constituting the wire harness 6, that is, at a position between the first electric connection 61 and the second electric connection 63, and in an area that includes this exposed portion 10, the water-stopping portion 4 filled with the water-stopping agent 5 is formed. There is no particular limitation to the specific position and the number of the water-stopping portions 4, but at least one water-stopping portion 4 is preferably provided at a position closer to the first electric connection 61 than the second electric connection 63, in view of effectively suppressing the influence of water on the first electric connection 61 that has the waterproof structure 62.

The wire harness 6 including electric connections 61 and 63 at both ends of the insulated electric wire 1 can be used to electrically connect two devices U1 and U2. For example, the first device U1 to which the first electric connection 61 having the waterproof structure 62 is connected may be a device such as an electric control unit (ECU) that requires waterproofing. On the other hand, the second device U2 to which the second electric connection 63 without any waterproof structure is connected may be a device that does not require waterproofing.

Since the insulated electric wire 1 constituting the wire harness 6 contains the water-stopping portion 4, even if water that has externally entered the wire harness 6 moves along the elemental wires 2a constituting the conductor 2, it is possible to suppress the movement of the water along the insulated electric wire 1 from progressing beyond the water-stopping portion 4. That is to say, it is possible to suppress external water from moving beyond the water-stopping portion 4, reaching the electric connections 61 and 63 at both ends, and further entering the devices U1 and U2 connected to the electric connections 61 and 63. For example, even if water adhering to the surface of the second electric connection 63 without any waterproof structure enters the second electric connection 63, and moves along the insulated electric wire 1 via the elemental wires 2a constituting the conductor 2, the movement of the water is stopped by the water-stopping agent 5 with which the water-stopping portion 4 is filled. As a result, the water cannot move to the side on which the first electric connection 61 is provided beyond the water-stopping portion 4, and can neither reach the position of the first electric connection 61 nor enter the first electric connection 61 and the first device U1. By suppressing water movement by the water-stopping portion 4 in this way, it is possible to efficiently use the waterproof characteristic of the waterproof structure 62 with respect to the first electric connection 61 and the device U1.

The effect of suppressing movement of water using the water-stopping portion 4 provided on the insulated electric wire 1 is realized regardless of the position at which the water adheres, the cause thereof, the environment when the water adheres, or the situation after the water adheres. For example, when the wire harness 6 is installed in an automobile, water that has entered a portion of the insulated electric wire 1, such as a gap between the elemental wires 2a, from the non-waterproof second electric connection 63 can be efficiently prevented from entering the first electric connection 61 having the waterproof structure 62 and the first device U1, due to capillary action or cold breathing. ☐Cold breathing☐ refers to a phenomenon in which, when the first electric connection 61 having the waterproof structure 62 and the first device U1 are heated when the automobile is driven for example, and then heat is discharged, the pressure on the first electric connection 61 side becomes lower and the pressure on the second electric connection 63 side becomes relatively higher, so that a difference in pressure occurs along the insulated electric wire 1, and water adhering to the second electric connection 63 climbs toward the first electric connection 61 and the first device U1.

[Method for Producing Insulated Electric Wire]

The following will describe an example of a method for producing the insulated electric wire 1 according to the above-described embodiment.

Figure 5:
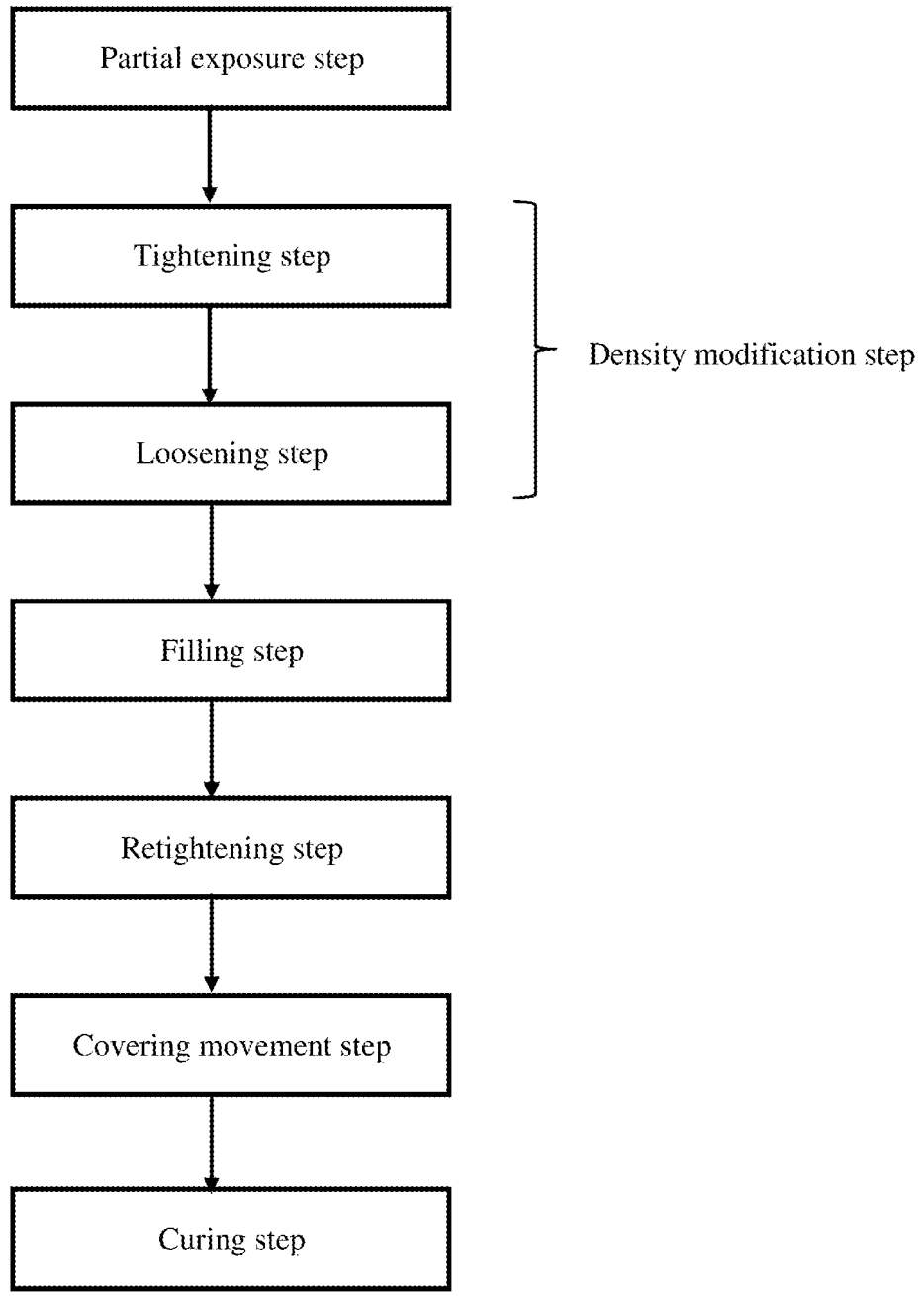
FIG. 5 is a flowchart illustrating steps for producing the insulated electric wire according to the embodiment.
Figure 6:
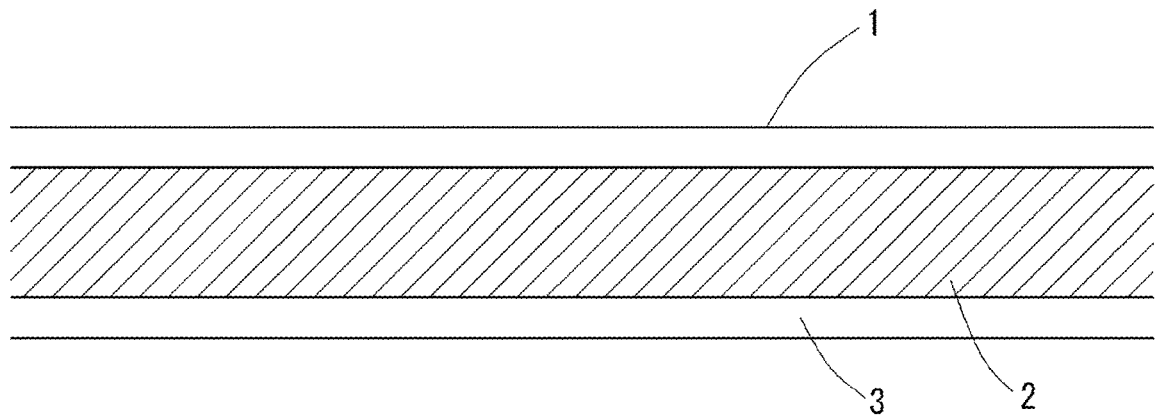
FIGS. 6A to 6C are cross-sectional views of the insulated electric wire, illustrating steps for producing the insulated electric wire.
Figure 6:
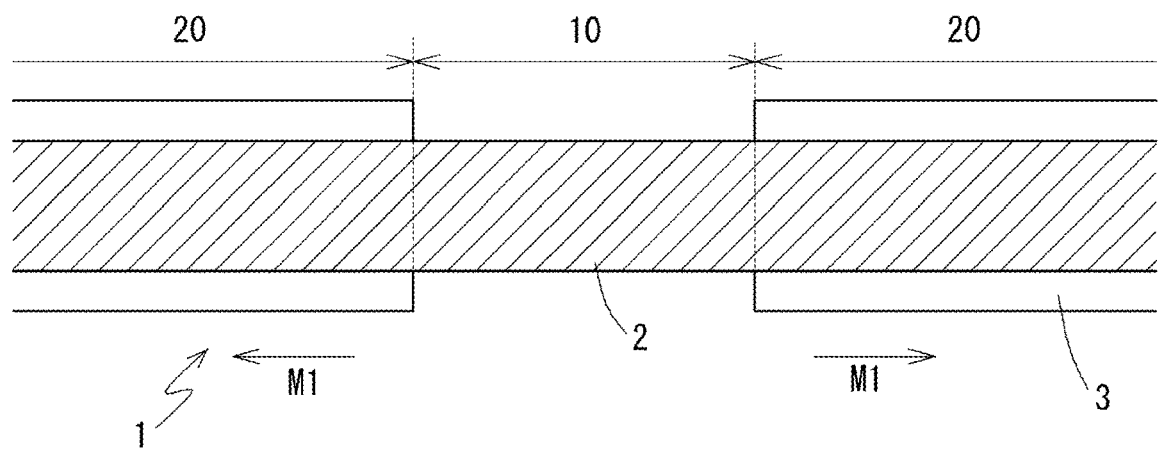
Figure 6:
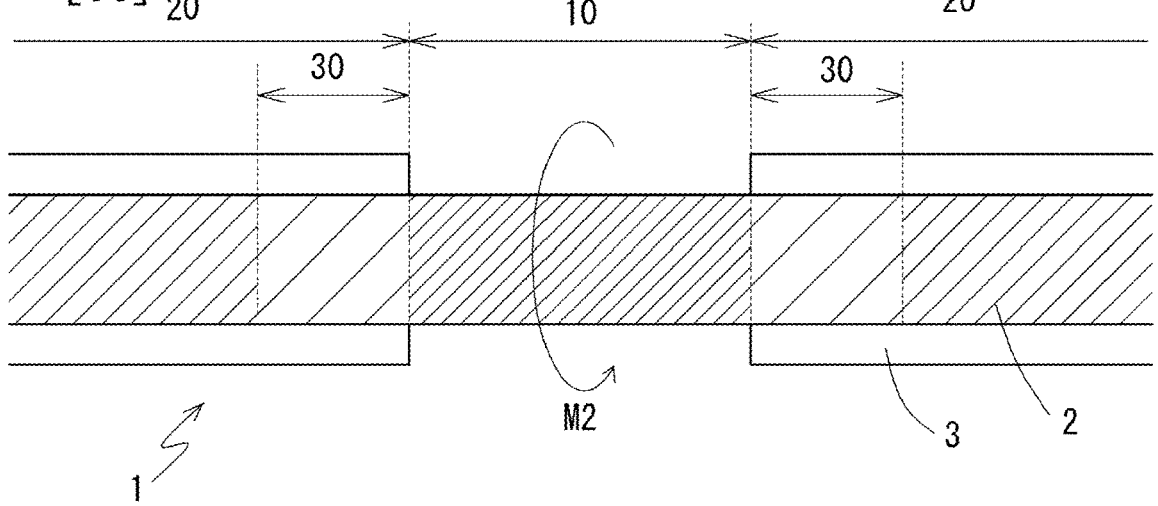
Figure 7:
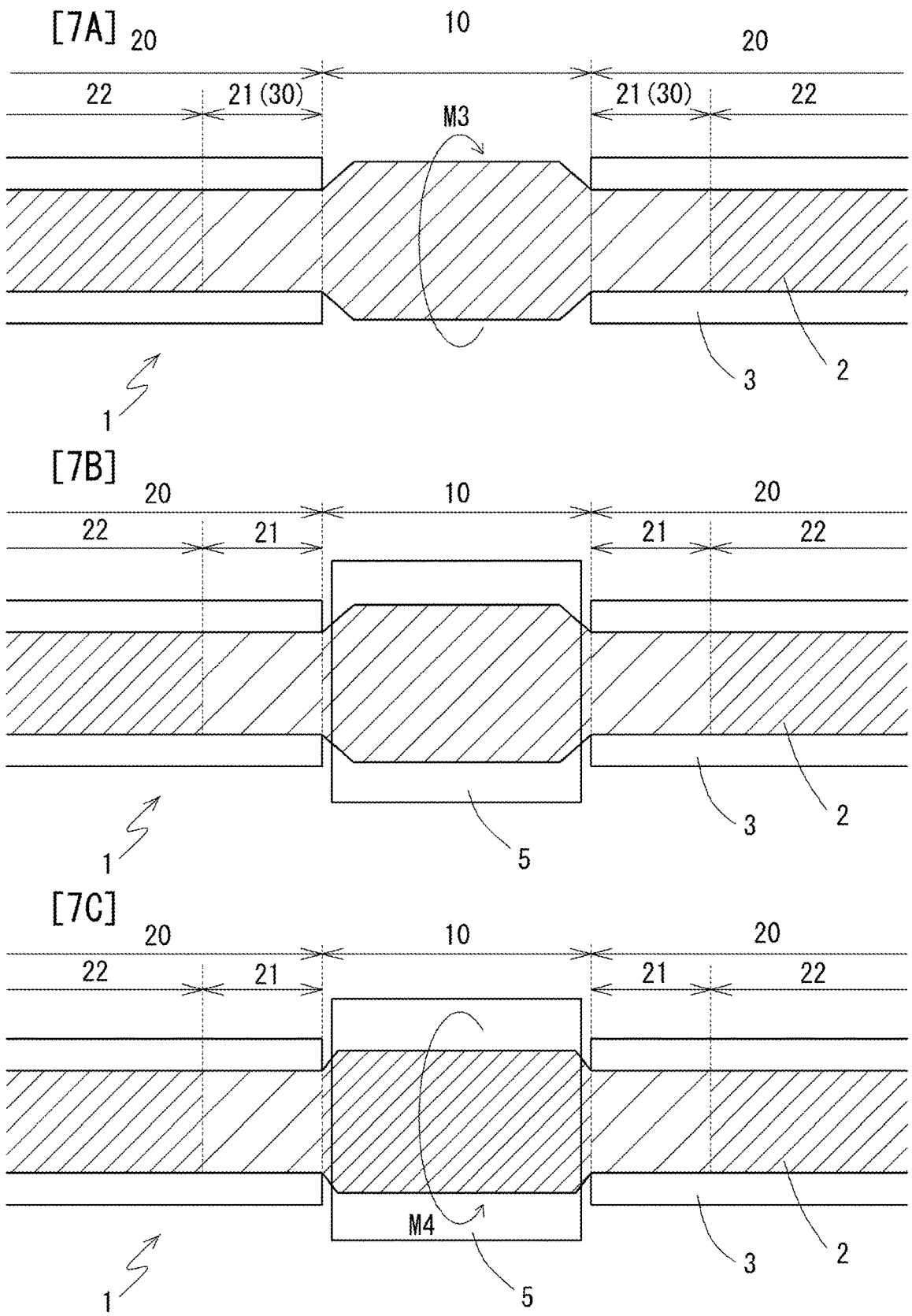
FIGS. 7A to 7C are cross-sectional views of the insulated electric wire, illustrating steps for producing the insulated electric wire.

FIG. 5 schematically illustrates a production method according to the present disclosure. In this method, the water-stopping portion 4 is formed in a partial area of the insulated electric wire 1 in the longitudinal axis direction thereof by performing: (1) a partial exposure step; (2) a density modification step; (3) a filling step; (4) a retightening step; (5) a covering movement step; and (6) a curing step, in this order. The density modification step (2) may include: (2-1) a tightening step; and subsequently (2-2) a loosening step. The steps will be explained below. Hereunder, a case where the water-stopping portion 4 is formed in a middle portion of the insulated electric wire 1 will be described. However, specific operations in the steps and the order of the steps may be adjusted as appropriate in accordance with details of the configuration of a water-stopping portion 4 to be formed, such as a position at which the water-stopping portion 4 is to be formed.

(1) Partial Exposure Step

First, in the partial exposure step, an exposed portion 10 as shown in FIG. 6B is formed in a continuous linear insulated electric wire 1 as shown in FIG. 6A. The covered portions 20 are provided adjacent to both sides of the exposed portion 10 in the longitudinal axis direction thereof.

In an example of the method for forming such an exposed portion 10, a substantially ring-shaped slit is formed in the outer circumference of the insulation covering 3 substantially at the center of the area in which the exposed portion 10 is to be formed. Then, the regions of the insulation covering 3 located on both sides of the slit are held from their outer circumference, and are pulled apart along the axial direction of the insulated electric wire 1 (movement M1). Along with this movement, the conductor 2 is exposed between the regions of the insulation coverings 3 on both sides. In such a way, the exposed portion 10 is formed adjacent to the covered portions 20.

(2) Density Modification Step

The filling step may be performed and the gaps between the elemental wires 2a constituting the conductor 2 in the exposed portion 10 may be filled with the water-stopping agent 5 directly after the exposed portion 10 in which the conductor 2 is exposed has been formed in the partial exposure step. However, it is preferable to perform the density modification step before the filling step so that the gaps between the elemental wires 2a are enlarged and can be filled with the water-stopping agent 5 with high uniformity.

In the density modification step, a non-uniform distribution of the density of the metal material is formed among the exposed portion 10, the adjacent area 21, and the remote area 22 of the covered portion 20, and the distances between the elemental wires 2a of the conductor 2 are increased in the exposed portion 10. Specifically, the non-uniform distribution of the density of the metal material is formed such that the density of the metal material per unit length is higher in the exposed portion 10 than in the remote areas 22. Such density distribution can be formed at the same time as when increasing the distances between the elemental wires 2a in the exposed portion 10 in the tightening step and the subsequent loosening step, for example.

(2-1) Tightening Step

As shown in FIG. 6C, in the tightening step, the twist of the elemental wires 2a in the exposed portion 10 is temporarily tightened relative to the original state. Specifically, the insulated electric wire 1 is twisted and rotated in the direction of the twist of the elemental wires 2a so that the twist is further tightened (movement M2). With this, the twist pitch of the elemental wires 2a in the exposed portion 10 is reduced, and the distances between the elemental wires 2a are reduced.

During this operation, when the covered portions 20 located on both sides of the exposed portion 10 are externally held at portions adjacent to the exposed portion 10, and the conductor 2 is twisted so that the holding portions (i.e., holding portions 30) are rotated in mutually opposite directions, the conductor 2 can be unwound from the holding portions 30 toward the exposed portion 10. As a result of the unwinding of the conductor 2, the twist pitch of the elemental wires 2a in the holding portions 30 is increased relative to the original pitch, and the density of the metal material per unit length is reduced from the original density, as shown in FIG. 6C. Consequently, a portion of the metal material originally located in the holding portions 30 is shifted to the exposed portion 10, and the twist pitch of the elemental wires 2a in the exposed portion 10 is reduced by this shift. Also, the density of the metal material per unit length in the exposed portion 10 is increased. It is preferable that a force of holding the insulated electric wire 1 in the holding portions 30 from the outer circumferential side be suppressed enough to allow the relative movement of the conductor 2 with respect to the insulation covering 3, in view of smoothly unwinding the conductor 2 from the holding portions 30 toward the exposed portion 10.

(2-2) Loosening Step

Thereafter, as shown in FIG. 7A, in the loosening step, the twist of the elemental wires 2a in the exposed portion 10 is loosened again from the state where the twist has been tightened in the tightening step. The twist can be loosened by simply releasing the holding of the holding portions 30 or by holding the holding portions 30 and twisting and rotating the holding portions 30 in the direction opposite to the tightening direction of the tightening step, that is, the direction opposite to the twist direction of the conductor 2 (movement M3).

During the operation, the portions of the conductor 2 unwound from the holding portions 30 located on both sides of the exposed portion 10 in the tightening step do not fully return into the areas covered with the insulation covering 3 due to the rigidity of the conductor 2, and at least partially remain in the exposed portion 10. As a result, the twist of the elemental wires 2a of the conductor 2 is loosened with the conductor 2 unwound to the exposed portion 10, and thus a state is realized in which the elemental wires 2a whose actual length is larger than the length before the tightening step is performed are bent and disposed in the exposed portion 10. That is, as shown in FIG. 7A, in the exposed portion 10, the diameter of the area constituted entirely by the conductor 2 is larger than the diameter before the tightening step is performed (in FIG. 6B), and the density of the metal material per unit length is increased. The twist pitch of the elemental wires 2a in the exposed portion 10 is at least larger than the twist pitch in the state where the twist is tightened in the tightening step, and is larger than the twist pitch before the tightening step is performed depending on the degree of loosening. In view of increasing the distances between the elemental wires 2a, the twist pitch of the elemental wires 2a in the exposed portion 10 is preferably larger than the twist pitch before the tightening step is performed.

After the loosening step, the holding portions 30 of the covered portions 20 where the insulation covering 3 was held externally in the tightening step will serve as the adjacent areas 21 in which the density of the metal material per unit length is lower than that in the exposed portion 10, and is also lower than that in the state before the tightening step is performed. The areas of the covered portions 20 that have not functioned as the holding portions 30 in the tightening step, that is, the areas distanced from the exposed portion 10, will be defined as the remote areas 22. In the remote areas 22, the states of the conductor 2, such as the density of the metal material per unit length and the twist pitch of the elemental wires 2a, do not substantially change from the states before the tightening step is performed. The portion of the metal material in the adjacent areas 21 obtained as a result of the reduction in the density per unit length is shifted to the exposed portion 10, and contributes to increasing the density of the metal material per unit length in the exposed portion 10. As a result, the exposed portion 10 has the highest density of the metal material per unit length, the remote areas 22 have the next highest density, and the adjacent areas 21 have the lowest density.

(3) Filling Step

Next, in the filling step, the gaps between the elemental wires 2a in the exposed portion 10 are filled with the uncured water-stopping agent 5, as shown in FIG. 7B. The filling operation with the water-stopping agent 5 may be performed by introducing liquid resin composition into the gaps between the elemental wires 2a using an appropriate method such as application, immersion, dripping, and injection that corresponds to such properties of the water-stopping agent 5 as viscosity.

In the filling step, in addition to filling the gaps between the elemental wires 2a with the water-stopping agent 5, the water-stopping agent 5 is also placed on the outer circumference of the conductor 2 in the exposed portion 10. To this end, for instance, the amount of the water-stopping agent 5 to be introduced into the exposed portion 10 only needs to be set such that the water-stopping agent 5 is left even after the gaps between the elemental wires 2a are filled. In this case, the water-stopping agent 5 may be placed on, in addition to the outer circumference of the exposed portion 10, the outer circumferential portion of the insulation covering 3 at the end portions of the covered portions 20. However, if the covering movement step is performed after the filling step, the water-stopping agent 5 introduced into the exposed portion 10 may be partially moved onto the outer circumferential portion of the insulation covering 3 in the covered portions 20 in the covering movement step. Accordingly, it is sufficient that the water-stopping agent 5 is placed on the outer circumference of the exposed portion 10 in addition to the gaps between the elemental wires 2a. By adjusting the amount of water-stopping agent 5 to be placed on the outer circumference of the conductor 2 in the exposed portion 10 in the filling step, the layer thickness La in the exposed portion outer circumferential area 42 and the layer thickness Lb in the covered portion outer circumferential area 43 of the water-stopping portion 4 to be formed can be controlled, and thus it is possible to realize the predetermined relationships (such as La>Lb and Lb<Lc).

Since the distances between the elemental wires 2a in the exposed portion 10 are increased in the density modification step and then the water-stopping agent 5 is introduced into the exposed portion 10 in the filling step, the water-stopping agent 5 easily permeates the widened spaces between the elemental wires 2a. Accordingly, the water-stopping agent 5 can easily permeate every part of the exposed portion 10 evenly with high uniformity. Consequently, after the water-stopping agent 5 is cured, a reliable water-stopping portion 4 having an excellent water-stopping performance can be formed. Also, even if the water-stopping agent 5 has a relatively high viscosity such as 4 Pa·s or higher, the water-stopping agent 5 can permeate the gaps between the elemental wires 2a with high uniformity by sufficiently increasing the gaps between the elemental wires 2a.

As described above, a predetermined portion of the insulated electric wire 1 such as an area between the elemental wires 2a may be filled with the water-stopping agent 5 by any method such as application or immersion. However, the portion is preferably filled with the water-stopping agent 5 by immersion, in view of improving the uniformity in filling with the water-stopping agent 5 or operability when water-stopping portions 4 are formed in multiple insulated electric wires 1.

For example, a jet device for jetting the water-stopping agent 5 is preferably used to immerse the predetermined portion of the insulated electric wire 1 in the water-stopping agent 5. In this case, it is also possible to bring the insulated electric wire 1 into contact with the jet flow of the water-stopping agent 5 while the insulated electric wire rotates around its axis, in order to place the water-stopping agent 5 with high uniformity.

(4) Retightening Step

After the completion of the filling step, the retightening step is performed as shown in FIG. 7C, and the distances between the elemental wires 2a are reduced in the exposed portion 10 in the state in which the gaps between the elemental wires 2a are filled with the water-stopping agent 5. Similar to the aforementioned tightening step of the density modification step for example, this step can be performed such that the covered portions 20 located on both sides of the exposed portion 10 are held at the adjacent areas 21 externally from the insulation covering 3, and the conductor 2 is twisted and rotated in the direction of the twist of the elemental wires 2a so that the twist of the elemental wires 2a is tightened (movement M4). In contrast to the tightening step, an operation of unwinding the conductor 2 to the exposed portion 10 is not performed in the retightening step.

When the gaps between the elemental wires 2a in the exposed portion 10 are narrowed in the retightening step, the water-stopping agent 5 is confined in the narrowed gaps. Thus, the water-stopping agent 5 is likely to stay in the gaps between the elemental wires 2a without flowing or dropping until the fluidity of the water-stopping agent 5 is sufficiently lowered due to curing or the like. Accordingly, after the water-stopping agent 5 is cured, a reliable water-stopping portion 4 having an excellent water-stopping performance is easily formed. To increase the effect, it is preferable that the twist pitch of the elemental wires 2a in the exposed portion 10 be reduced in the retightening step. For instance, it is preferable that after the retightening step, the twist pitch of the elemental wires 2a be smaller in the exposed portion 10 than in the adjacent areas 21 as well as in the remote areas 22. It is also preferable that after the retightening step, the exposed portion 10 has the same outer diameter as that of the covered portions 20.

The retightening step is preferably performed while the water-stopping agent 5 filling up the gaps between the elemental wires 2a is flowable, that is, before the water-stopping agent 5 is cured, or during the curing process. Accordingly, the retightening operation is unlikely to be impaired by the water-stopping agent 5.

Specifically, when the aforementioned filling step is performed by immersing the insulated electric wire 1 in the water-stopping agent 5 using the jet device or the like, the retightening step is preferably performed with the insulated electric wire 1 immersed in the water-stopping agent 5. This can easily avoid a situation where the water-stopping agent 5 is dropped out and removed from the gaps between the elemental wires 2a due to the retightening operation itself. For example, preferably, after the predetermined portion of the insulated electric wire 1 including the exposed portion 10 has been brought into contact with the jet flow of the water-stopping agent 5, and the water-stopping agent 5 has been placed into the gaps between the elemental wires 2a or the like in the filling step, the retightening step is performed by twisting and rotating the conductor 2 (movement M4) while the insulated electric wire 1 is in contact with the jet flow.

(5) Covering Movement Step

Next, in the covering movement step, as shown in FIG. 8A, the regions of the insulation covering 3 located in the covered portions 20 on both sides of the exposed portion 10 are moved towards the exposed portion 10, approaching each other (movement M5). Similarly to the retightening step, the covering movement step is preferably performed while the water-stopping agent 5 filling up the exposed portion 10 is flowable, that is, before the water-stopping agent 5 is cured, or during the curing process. The covering movement step and the retightening step may also be performed substantially in a single operation. As described above, when the filling step is performed by immersing the insulated electric wire 1 in the water-stopping agent 5 using the jet device or the like, and the retightening step is performed in this state, preferably, the covering movement step is also performed in the state in which the insulated electric wire 1 is immersed in the water-stopping agent 5.

Even if there is an area in which the gaps between the elemental wires 2a cannot be filled with the sufficient amount of water-stopping agent 5 in the filling step at an end of the exposed portion 10 or the like, the water-stopping agent 5 will reach such an area in the covering movement step, and a state will be realized in which the gaps between the elemental wires 2a are filled with the water-stopping agent 5 in the entire exposed portion 10 in which the conductor 2 is exposed. Furthermore, a part of the water-stopping agent 5 placed on the outer circumference of the conductor 2 in the exposed portion 10 can be moved to the outer circumference of the insulation covering 3 in the covered portions 20. Thus, the water-stopping agent 5 is continuously placed over three areas, namely, the gaps between the elemental wires 2a in the exposed portion 10, the outer circumference of the conductor 2 in the exposed portion 10, and the outer circumferences of the parts of the insulation covering 3 at the ends of the covered portions 20.

Since the water-stopping agent 5 is placed over the three areas, it is possible to form, after the subsequent curing step, a water-stopping portion 4 in which the filled area 41 between the elemental wires, the exposed portion outer circumferential area 42, and the covered portion outer circumferential areas 43 are continuous with each other. That is to say, upon the following curing step, it is possible to form a water-stopping portion 4 that has an excellent water-stopping performance in the areas between the elemental wires 2a, has an outer circumference physically protected and electrically insulated, and has an excellent water-stopping performance between the conductor 2 and the insulation covering 3, using the same material at the same time. The covering movement step may be omitted if, in the filling step, a sufficient amount of water-stopping agent 5 can be introduced into an area extending over the entire exposed portion 10, and further to an area including the end portions of the covered portions 20 located on both sides of the exposed portion 10, for example.

(6) Curing Step

Finally, the water-stopping agent 5 is cured in the curing step. At this time, a curing method that corresponds to the type of curability of the water-stopping agent 5 only needs to be used. For example, if the water-stopping agent 5 has heat curability, it may be cured by heating, if the water-stopping agent 5 has light curability, it may be cured by light irradiation, and if the water-stopping agent 5 has moisture curability, it may be cured by humidification, e.g., while being arranged in the atmosphere.

In the curing step, as shown in FIG. 8B, the insulated electric wire 1 is preferably rotated around its axis (movement M6) until the water-stopping agent 5 is fully cured. If the water-stopping agent 5 is cured without rotating the insulated electric wire 1, that is, while the insulated electric wire 1 remains unmoved, the uncured water-stopping agent 5 will drop following the gravity, and the water-stopping agent 5 will be cured in a state in which a thicker layer of the water-stopping agent 5 is formed at a lower position in the gravity direction than at a higher position. Thus, after curing the water-stopping agent 5, the conductor 2 will be eccentric in the water-stopping portion 4, and there is a possibility that non-uniformity in the water-stopping performance or physical characteristics may occur along the circumferential direction of the insulated electric wire 1. For example, the material strength or the water-stopping performance of the water-stopping agent 5 may be impaired in a portion in which the layer thickness of the water-stopping agent 5 is reduced, while the water-stopping agent 5 is likely to be damaged when coming into contact with an external object in a portion in which the layer thickness of the water-stopping agent 5 is increased.

Accordingly, by performing the curing step while rotating the insulated electric wire 1 around its axis, the uncured water-stopping agent 5 is unlikely to stay at one position in the circumferential direction of the insulated electric wire 1, and the layers of the water-stopping agent 5 are likely to have a highly uniform thickness around the entire circumference. Thus, a water-stopping portion 4 having a linear shape is easily obtained, and the eccentricity of the conductor 2 in the water-stopping portion 4 is reduced, making it possible to realize a water-stopping portion 4 having highly uniform water-stopping performance and physical characteristics. Furthermore, if the water-stopping agent 5 has light curability, performing the curing step while rotating the insulated electric wire 1 around its axis makes it possible to irradiate the entire insulated electric wire 1 in the circumferential direction with the light L from the light source 80, and thus the light curing of the water-stopping agent 5 over the entire circumference can progress uniformly. If after the completion of the filling step, the retightening step, and the covering movement step, time is needed to move the insulated electric wire 1 between processing devices for example, before the curing step is started, it is preferable to keep the insulated electric wire 1 rotated around its axis also during such period of time, so that the water-stopping agent 5 is prevented from dropping at a specific position in the circumferential direction.

Embodiments of the present disclosure have been described in detail but the present invention is in no way restricted to the embodiments described above and can be modified variously in a range without departing from the gist of the present invention.

LIST OF REFERENCE NUMERALS

1 Insulated electric wire
2 Conductor
2a Elemental wire
2a1 Elemental wire located outer circumferential portion of conductor
2a2 Elemental wire located inward of elemental wire 2a1
3 Insulation covering
4 Water-stopping portion
5 Water-stopping agent
5a Surface of water-stopping agent
6 Wire harness
10 Exposed portion
20 Covered portion
21 Adjacent area
22 Remote area
30 Holding portion
41 Filled area between the elemental wires
42 Exposed portion outer circumferential area
43 Covered portion outer circumferential area
44 Tapered portion
61 First electric connection
62 Waterproof structure
63 Second electric connection
80 Light source
B Bubble
L Light
La Layer thickness of water-stopping agent in exposed portion outer circumferential area
Lb Layer thickness of water-stopping agent in covered portion outer circumferential area
Lc Thickness of insulation covering
M1 to M6 Movement

The invention claimed is:

1. An insulated electric wire comprising:
a conductor in which a plurality of elemental wires made of a metal material are twisted together; and
an insulation covering that covers an outer circumference of the conductor,
wherein the insulated electric wire comprises:
an exposed portion in which the insulation covering is removed from the outer circumference of the conductor;
a covered portion in which the insulation covering covers the outer circumference of the conductor, the exposed portion and the covered portion being provided adjacent to each other in a longitudinal axis direction of the insulated electric wire; and
a water-stopping portion in which a water-stopping agent is placed over the exposed portion and an area of the covered portion that is adjacent to the exposed portion, and
the water-stopping portion comprises:
a filled area between the plurality of elemental wires in which gaps between the plurality of elemental wires in the exposed portion are filled with the water-stopping agent;
an exposed portion outer circumferential area in which the water-stopping agent covers the outer circumference of the conductor in the exposed portion; and
a covered portion outer circumferential area in which the water-stopping agent covers an outer circumference of the insulation covering in the area of the covered portion that is adjacent to the exposed portion, wherein
the filled area between the plurality of elemental wires, the exposed portion outer circumferential area, and the covered portion outer circumferential area are continuous with each other,
a twist pitch of the plurality of elemental wires in the exposed portion is less than a twist pitch at least in a remote area that is an area of the covered portion except for an area adjacent to the exposed portion,
a layer thickness of the water-stopping agent in the exposed portion outer circumferential area is greater than a layer thickness in the covered portion outer circumferential area,
the layer thickness of the water-stopping agent in the covered portion outer circumferential area is less than a thickness of the insulation covering,
an elasticity modules of the water-stopping agent is greater than an elasticity modulus of the insulation covering, and
the water-stopping agent directly contacts a surface of the insulation covering in the covered portion and a surface of the conductor in the exposed portion.

2. The insulated electric wire according to claim 1, wherein the elasticity modulus of the water-stopping agent is not greater than twice the elasticity modulus of the insulation covering.

3. The insulated electric wire according claim 1, wherein the water-stopping portion has, at an end of the covered portion outer circumferential area that corresponds to an end of the entire water-stopping portion in the longitudinal axis direction, a tapered structure in which a layer of the water-stopping agent becomes thinner outward in the longitudinal axis direction.

4. The insulated electric wire according to claim 1, wherein an outer circumferential surface of the water-stopping portion except for end portions in the longitudinal axis direction does not have any difference in height that is equal to or greater than the layer thickness of the water-stopping agent in the covered portion outer circumferential area.

5. The insulated electric wire according to claim 4, wherein the outer circumferential surface of the water-stopping portion except for the end portions in the longitudinal axis direction does not have any difference in height that is equal to or greater than 20% of the layer thickness of the water-stopping agent in the covered portion outer circumferential area.

6. The insulated electric wire according to claim 1, wherein the water-stopping agent has a flexural modulus at room temperature of 300 MPa or lower.

7. The insulated electric wire according to claim 1, wherein ellipticities of the plurality of elemental wires in a cross section of the water-stopping portion taken perpendicular to the longitudinal axis direction of the insulated electric wire are smaller than ellipticities of the plurality of elemental wires in a cross section of the covered portion taken perpendicular to the longitudinal axis direction of the insulated electric wire.

8. A wire harness comprising the insulated electric wire according to claim 1.

* * * * *